United States Patent
Hoshika et al.

(10) Patent No.: US 10,251,525 B2
(45) Date of Patent: Apr. 9, 2019

(54) METHOD AND APPARATUS FOR FORMING COMPRESSION-BONDING PORTION TO CONTINUOUS BODY OF WEB MEMBER WITH FIBER BUNDLE

(71) Applicant: UNICHARM Corporation, Ehime (JP)

(72) Inventors: Kazuhiko Hoshika, Kagawa (JP); Yoshihide Ishikawa, Kagawa (JP); Hisaoki Nobukuni, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 15/529,486

(22) PCT Filed: Nov. 28, 2014

(86) PCT No.: PCT/JP2014/081623
§ 371 (c)(1),
(2) Date: May 24, 2017

(87) PCT Pub. No.: WO2016/084250
PCT Pub. Date: Jun. 2, 2016

(65) Prior Publication Data
US 2017/0258288 A1    Sep. 14, 2017

(51) Int. Cl.
*A47L 13/38*    (2006.01)
*A47L 13/42*    (2006.01)
(Continued)

(52) U.S. Cl.
CPC ............ *A47L 13/38* (2013.01); *A47L 13/16* (2013.01); *A47L 13/20* (2013.01); *A47L 13/46* (2013.01);
(Continued)

(58) Field of Classification Search
CPC .......... A47L 13/10; A47L 13/16; A47L 13/38; A47L 13/42; A47L 13/46; B29C 65/18;
(Continued)

(56) References Cited

U.S. PATENT DOCUMENTS 4,333,979 A    6/1982  Sciaraffa et al.
4,493,868 A    1/1985  Meitner
(Continued)

FOREIGN PATENT DOCUMENTS

EP    2431513 A1    3/2012
JP    62-125061 A    6/1987
(Continued)

OTHER PUBLICATIONS

Office Action in CA Application No. 2966472, dated May 24, 2017.
(Continued)

*Primary Examiner* — Michael A Tolin
(74) *Attorney, Agent, or Firm* — Hauptman Ham, LLP

(57) ABSTRACT

A method for forming compression-bonding portions in a continuous body including a fiber bundle while conveying the continuous body includes: rotating a rotator to convey the continuous body; compressing a target part of each of the compression-bonding portions in the continuous body using a first compression-bonding apparatus and the rotator to form the compression-bonding portions of a first stage; and further compressing each of the compression-bonding portions of the first stage using a second compression-bonding apparatus and the rotator to form the compression-bonding portions of a second stage. At least one of the compression-bonding portions is positioned between the first compression-bonding apparatus and the second compression-bonding apparatus in the direction of rotation of the rotator when the second compression-bonding apparatus compresses the compression-bonding portion of the first stage.

10 Claims, 10 Drawing Sheets

(51) Int. Cl.

| | | |
|---|---|---|
| *A47L 13/46* | (2006.01) | |
| *B32B 5/02* | (2006.01) | |
| *B32B 5/26* | (2006.01) | |
| *A47L 13/16* | (2006.01) | |
| *A47L 13/20* | (2006.01) | |
| *B32B 37/10* | (2006.01) | |
| *B29C 65/00* | (2006.01) | |
| *B32B 37/00* | (2006.01) | |
| *D04H 3/005* | (2012.01) | |
| *D04H 3/14* | (2012.01) | |
| *D06C 15/02* | (2006.01) | |
| *D06C 23/04* | (2006.01) | |
| *D04H 3/08* | (2006.01) | |

(52) U.S. Cl.
CPC .. *B29C 66/81463* (2013.01); *B29C 66/83413* (2013.01); *B32B 5/022* (2013.01); *B32B 5/26* (2013.01); *B32B 37/0076* (2013.01); *B32B 37/10* (2013.01); *D04H 3/005* (2013.01); *D04H 3/14* (2013.01); *D06C 15/02* (2013.01); *D06C 23/04* (2013.01); *A47L 13/42* (2013.01); *B32B 5/02* (2013.01); *B32B 2250/20* (2013.01); *B32B 2432/00* (2013.01); *D04H 3/08* (2013.01)

(58) Field of Classification Search
CPC ............... B29C 65/20; B29C 66/81463; B29C 66/81465; B29C 66/83411; B29C 66/83413; B32B 5/02; B32B 5/022; B32B 5/26; B32B 37/0076; B32B 37/0084; B32B 37/02; B32B 2250/20; B32B 2432/00; D04H 3/005; D04H 3/08; D04H 3/14
See application file for complete search history.

(56) References Cited

U.S. PATENT DOCUMENTS

| | | | |
|---|---|---|---|
| 4,713,132 A * | 12/1987 | Abel | ................ B29C 65/087 156/290 |
| 5,057,357 A | 10/1991 | Winebarger | |
| 6,143,393 A | 11/2000 | Abe et al. | |
| 8,151,402 B2 * | 4/2012 | Takabayashi | ........... A47L 13/20 15/209.1 |
| 2002/0148061 A1 | 10/2002 | Tanaka et al. | |
| 2006/0068167 A1 | 3/2006 | Keck et al. | |
| 2007/0251643 A1 | 11/2007 | Umebayashi et al. | |
| 2011/0123773 A1 | 5/2011 | Lofink et al. | |
| 2011/0277258 A1 | 11/2011 | Otsuka et al. | |

FOREIGN PATENT DOCUMENTS

| | | |
|---|---|---|
| JP | 11-235301 A | 8/1999 |
| JP | 2004-195709 A | 7/2004 |
| JP | 2005-40641 A | 2/2005 |
| JP | 4592690 B2 | 12/2010 |
| JP | 2011-16021 A | 1/2011 |
| JP | 2013-99429 A | 5/2013 |
| JP | 2013-117074 A | 6/2013 |
| JP | 2013-147784 A | 8/2013 |
| JP | 2014-129634 A | 7/2014 |

OTHER PUBLICATIONS

International Preliminary Report on Patentability in PCT/JP2014/081623, dated Jun. 8, 2017, 16pp.
International Search Report in PCT Application No. PCT/JP2014/081623, dated Feb. 17, 2015.
Extended European Search Report in EP Application No. 14906959.3, dated Jan. 29, 2018, 11pp.
Extended European Search Report in EP Application No. 14907155.7, dated Jan. 29, 2018, 9pp.
Office Action in U.S. Appl. No. 15/529,487, dated Jan. 26, 2018, 16pp.
International Search Report in PCT Application No. PCT/JP2014/081625, dated Feb. 17, 2015, 4pp.
Written Opinion of the ISA in PCT/JP2014/081625, dated Feb. 17, 2015, 13pp.
Office Action in CA Application No. 2968428, dated Jun. 14, 2017, 4pp.

* cited by examiner

METHOD AND APPARATUS FOR FORMING COMPRESSION-BONDING PORTION TO CONTINUOUS BODY OF WEB MEMBER WITH FIBER BUNDLE

RELATED APPLICATIONS

The present application is a national phase of International Application Number PCT/JP2014/081623, filed Nov. 28, 2014.

TECHNICAL FIELD

The present invention relates to a method and an apparatus for forming a compression-bonding portion in a continuous body of a web member with a fiber bundle such as a tow, which is used to manufacture a cleaning web member.

BACKGROUND ART

Conventionally, there is known a cleaning web member that includes a fiber bundle such as a tow used for cleaning (Patent Literature 1). To integrally bundle and fix fibers constituting the fiber bundle, a compression-bonding portion is formed in the web member.

CITATION LIST

Patent Literature

[PTL 1] 2005-40641

SUMMARY OF INVENTION

Technical Problem

FIG. 1 is a schematic explanatory view of a first reference example illustrating a process to form a compression-bonding portion jm'. Fiber bundles of a web member when being sent in this process are in a state of being continuous in a predetermined direction while the fiber direction is set along the predetermined direction. Therefore, the web member is also in a state of being a continuous body $1a'$ that is continuous in the predetermined direction. In this process, while the continuous body $1a'$ of the web member is conveyed in the predetermined direction set as a direction of conveyance, the compression-bonding portions jm' are formed at intervals each corresponding to a product pitch in the direction of conveyance.

Here, the compression-bonding portions jm' are formed, for example, in two stages. That is, for example, a first compression-bonding apparatus 41' and a second compression-bonding apparatus 42' are disposed at two positions in a direction of rotation Dc21' of a rotating drum 21' which is configured to convey the continuous body $1a'$ of the web member while holding it on an outer peripheral surface $21a'$. When a formation target part jmp' of the compression-bonding portion jm' in the continuous body $1a'$ of the web member passes through a position of the first compression-bonding apparatus 41', the first compression-bonding apparatus 41' compresses the formation target part jmp' in cooperation with a supporting portion $21s'$ on the outer peripheral surface $21a'$ of the rotating drum 21', to form a compression-bonding portion jm1' of a first stage. Thereafter, this compression-bonding portion jm1' of the first stage passes through a position of the second compression-bonding apparatus 42', which is positioned downstream in the direction of rotation Dc21'. At this time, the second compression-bonding apparatus 42' further compresses the compression-bonding portion jm1' of the first stage in cooperation with the supporting portion $21s'$ on the outer peripheral surface $21a'$ of the rotating drum 21', to form a compression-bonding portion jm2' of a second stage. Consequently, the compression-bonding portion jm' is formed in the continuous body $1a'$ of the web member in two stages.

However, in this method, a compression process performed for the compression-bonding portion jm1' of the first stage by the second compression-bonding apparatus 42' may adversely affect the process of forming the compression-bonding portion jm1' of the first stage, which is performed by the first compression-bonding apparatus 41' positioned upstream in the direction of rotation Dc21'. For example, when the second compression-bonding apparatus 42' compresses the compression-bonding portion jm1' of the first stage, a tensile force F may be generated along the direction of conveyance in the continuous body $1a'$ of the web member. Such tensile force F may be transmitted to the upstream side in the direction of rotation Dc21' in each fiber of the fiber bundle. This may result in disturbance of a fiber distribution of the fiber bundle.

In this respect, as illustrated in a second reference example in FIG. 2, if at least one compression-bonding portion jm1' of the first stage is positioned between the first compression-bonding apparatus 41' and the second compression-bonding apparatus 42' at a time when the second compression-bonding apparatus 42' compresses the compression-bonding portion jm1' of the first stage, the transmission of the tensile force F in each fiber is mostly cut off at a position of this compression-bonding portion jm1' of the first stage. That is, this tensile force F in each fiber is difficult to be transmitted up to the position of the first compression-bonding apparatus 41'. This reduces adverse effects, for example, exerted by the disturbance of the distribution of the fiber bundles as described above, onto the process of forming the compression-bonding portion jm1' of the first stage.

The present disclosure has been made in view of conventional problems as described above. An aspect of the present disclosure is to restrain negative effects caused by a compression process of a compression-bonding portion of a first stage performed by a second compression-bonding apparatus, from being exerted on a formation process of the compression-bonding portion of the first stage performed by a first compression-bonding apparatus positioned upstream in a direction of rotation.

Solution to Problem

An aspect of the present disclosure to achieve an aspect described above is a method for forming compression-bonding portions in a continuous body of a web member including a fiber bundle, while conveying the continuous body in a predetermined direction set as a direction of conveyance, the fiber bundle being continuous in the predetermined direction while a fiber direction is set along the predetermined direction, the compression-bonding portions being formed at intervals in the direction of conveyance, the method comprising: rotating a rotator around a rotation axis along a CD direction intersecting with the direction of conveyance, while holding the continuous body of the web member on an outer peripheral surface of the rotator, to convey the continuous body of the web member in a direction of rotation of the rotator set as the direction of conveyance; compressing a formation target part of each of the compression-bonding portions in the continuous body of the web member, using a first compression-bonding apparatus and the rotator, when the formation target part passes through a position of the first compression-bonding apparatus disposed at a predetermined position in the direction of rotation, to form the compression-bonding portions of a first stage; and further compressing each of the compression-bonding portions of the first stage using a second compression-bonding apparatus and the rotator, when the compression-bonding portion of the first stage passes through a position of the second compression-bonding apparatus disposed downstream in the direction of rotation from the first compression-bonding apparatus, to form the compression-bonding portions of a second stage, the compression-bonding portions of the first stage including at least one compression-bonding portion that is positioned between the first compression-bonding apparatus and the second compression-bonding apparatus in the direction of rotation when the second compression-bonding apparatus compresses the compression-bonding portion of the first stage.

An apparatus for forming compression-bonding portions in a continuous body of a web member including a fiber bundle, while conveying the continuous body in a predetermined direction set as a direction of conveyance, the fiber bundle being continuous in the predetermined direction while a fiber direction is set along the predetermined direction, the compression-bonding portions being formed at intervals in the direction of conveyance, the apparatus comprising: a conveying apparatus configured to rotate a rotator around a rotation axis along a CD direction intersecting with the direction of conveyance, while holding the continuous body of the web member on an outer peripheral surface of the rotator, to convey the continuous body of the web member in a direction of rotation of the rotator set as the direction of conveyance; a first compression-bonding apparatus configured to compress a formation target part of each of the compression-bonding portions in the continuous body of the web member in corporation with the rotator, when the formation target part passes through a predetermined position in the direction of rotation, to form the compression-bonding portions of a first stage; and a second compression-bonding apparatus configured to further compress the compression-bonding portion of the first stage in corporation with the rotator, when each of the compression-bonding portions of the first stage passes through a position downstream in the direction of rotation from the predetermined position, to form the compression-bonding portions of a second stage, the compression-bonding portions of the first stage including at least one compression-bonding portion that is positioned between the first compression-bonding apparatus and the second compression-bonding apparatus in the direction of rotation when the second compression-bonding apparatus compresses the compression-bonding portion of the first stage.

Other features of the present disclosure will be become apparent from descriptions of the present specification and of the accompanying drawings.

Advantageous Effects

According to the present disclosure, adverse effects caused by a compression process of a compression-bonding portion of a first stage performed by a second compression-bonding apparatus can be restrained from being exerted on a formation process of the compression-bonding portion of the first stage performed by a first compression-bonding apparatus positioned upstream in a direction of rotation.

DESCRIPTION OF EMBODIMENTS

Figure 1:
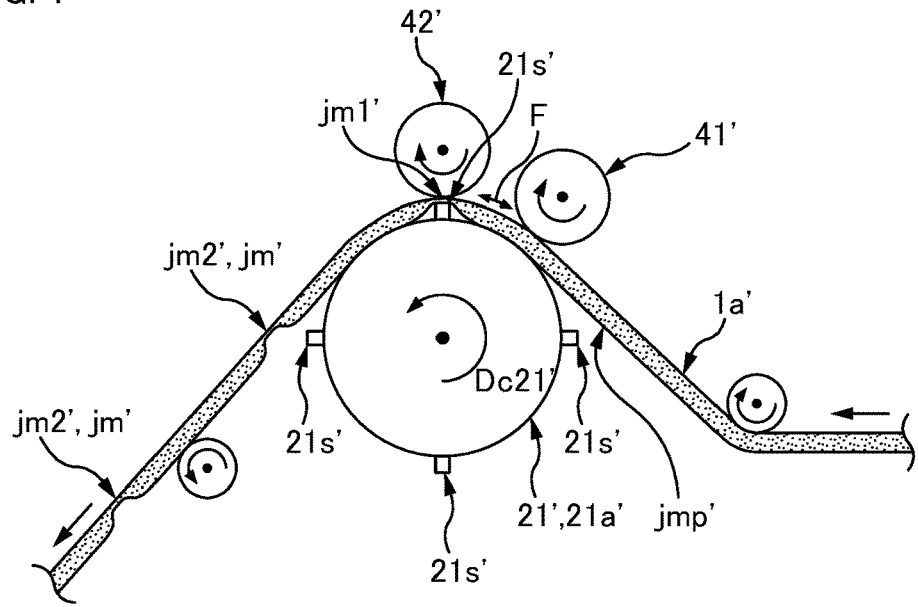
FIG. 1 is a schematic explanatory view of a first reference example illustrating a process of forming a compression-bonding portion jm'.
Figure 2:
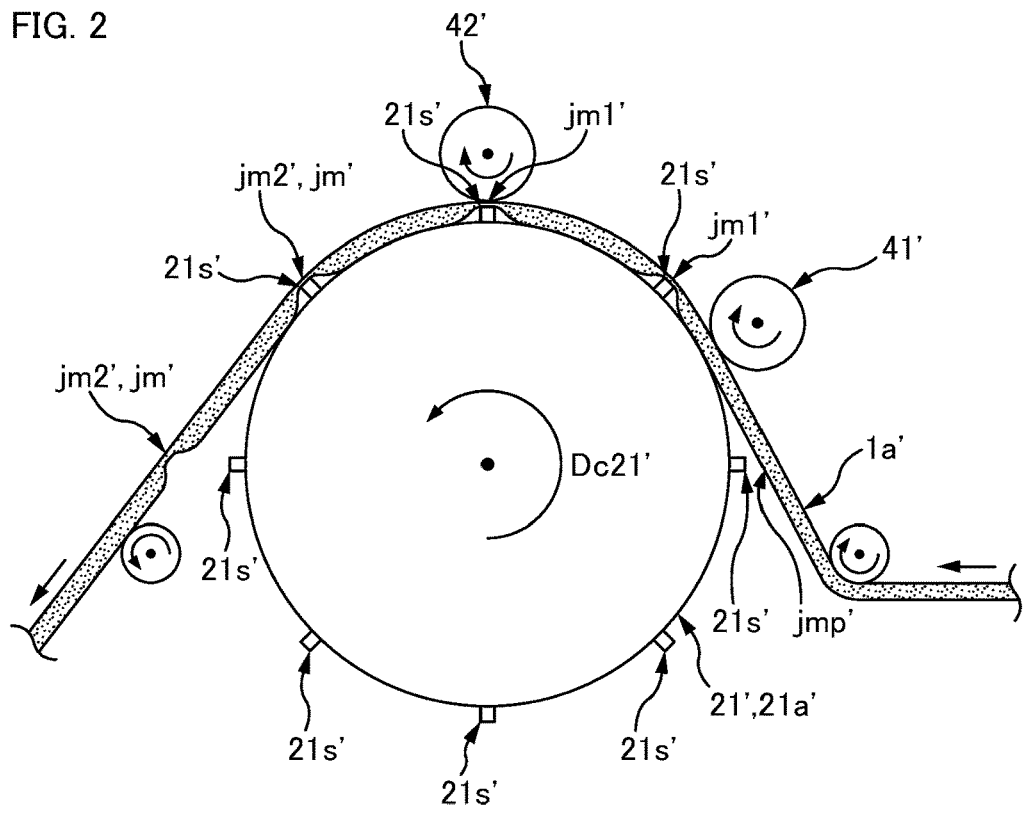
FIG. 2 is a schematic explanatory view of a second reference example illustrating a process.

At least the following matters will become apparent from descriptions of the present specification and the accompanying drawings.

A method for forming compression-bonding portions in a continuous body of a web member including a fiber bundle, while conveying the continuous body in a predetermined direction set as a direction of conveyance, the fiber bundle being continuous in the predetermined direction while a fiber direction is set along the predetermined direction, the compression-bonding portions being formed at intervals in the direction of conveyance, the method comprising: rotating a rotator around a rotation axis along a CD direction intersecting with the direction of conveyance, while holding the continuous body of the web member on an outer peripheral surface of the rotator, to convey the continuous body of the web member in a direction of rotation of the rotator set as the direction of conveyance; compressing a formation target part of each of the compression-bonding portions in the continuous body of the web member, using a first compression-bonding apparatus and the rotator, when the formation target part passes through a position of the first compression-bonding apparatus disposed at a predetermined position in the direction of rotation, to form the compression-bonding portions of a first stage; and further compressing each of the compression-bonding portions of the first stage using a second compression-bonding apparatus and the rotator, when the compression-bonding portion of the first stage passes through a position of the second compression-bonding apparatus disposed downstream in the direction of rotation from the first compression-bonding apparatus, to form the compression-bonding portions of a second stage, the compression-bonding portions of the first stage including at least one compression-bonding portion that is positioned between the first compression-bonding apparatus and the second compression-bonding apparatus in the direction of rotation when the second compression-bonding apparatus compresses the compression-bonding portion of the first stage.

With the method for forming the compression-bonding portions in the continuous body of the web member including the fiber bundle, when the second compression-bonding apparatus compresses the compression-bonding portions of the first stage, at least one of the compression-bonding portions of the first stage is positioned between the first compression-bonding apparatus and the second compression-bonding apparatus. Accordingly, transmission of a tensile force in each fiber in the direction of conveyance, which may occur in the continuous body of the web member when the compression-bonding portion of the first stage is compressed, is almost cut off at the at least one of the compression-bonding portions of the first stage positioned between the first compression-bonding apparatus and the second compression-bonding apparatus in the direction of rotation. That is, this tensile force in each fiber is hardly transmitted up to the position of the first compression-bonding apparatus. Therefore, the adverse effects exerted from the compression process performed for the compression-bonding portion of the first stage by the second compression-bonding apparatus onto the process of forming the compression-bonding portion of the first stage performed using the first compression-bonding apparatus positioned upstream in the direction of rotation.

In the method for forming the compression-bonding portions in the continuous body of the web member including the fiber bundle, it is preferable that when the second compression-bonding apparatus compresses the compression-bonding portion of the first stage, a plurality of the compression-bonding portions of the first stage are positioned between the first compression-bonding apparatus and the second compression-bonding apparatus in the direction of rotation.

With the method for forming the compression-bonding portions in the continuous body of the web member including the fiber bundle, when the second compression-bonding apparatus compresses each compression-bonding portion of the first stage, a plurality of the compression-bonding portions of the first stage is positioned between the first compression-bonding apparatus and the second compression-bonding apparatus. Accordingly, the transmission of the tensile force in each fiber can be reliably cut off at the position(s) between the first compression-bonding apparatus and the second compression-bonding apparatus in the direction of rotation.

In the method for forming the compression-bonding portions in the continuous body of the web member including the fiber bundle, it is preferable that when the second compression-bonding apparatus compresses the compression-bonding portion of the first stage, only one of the compression-bonding portions of the first stage is positioned between the first compression-bonding apparatus and the second compression-bonding apparatus in the direction of rotation.

With the method for forming the compression-bonding portions in the continuous body of the web member including the fiber bundle, when the second compression-bonding apparatus compresses each compression-bonding portion of the first stage, only one of the compression-bonding portions of the first stage is positioned between the first compression-bonding apparatus and the second compression-bonding apparatus. Accordingly, the second compression-bonding portion can compress the compression-bonding portion of the first stage while the transmission of the tensile force in each fiber is appropriately cutoff and heat at the time when the first compression-bonding apparatus forms the compression-bonding portion of the first stage remains. Consequently, the second compression-bonding apparatus easily forms the compression-bonding portions of the second stage.

In the method for forming the compression-bonding portions in the continuous body of the web member including the fiber bundle, it is preferable that one of the first compression-bonding apparatus and the second compression-bonding apparatus perform compression, while an other of the first compression-bonding apparatus and the second compression-bonding apparatus does not perform compression.

According to the method for forming the compression-bonding portions in the continuous body of the web member including the fiber bundle, it is possible to restrain, for example, the tensile force caused in the continuous body of the web member when one of the first compression-bonding apparatus and the second compression-bonding apparatus performs compression, from being transmitted to pull a part of the continuous body of the web member that is being compressed by the other compression-bonding apparatus. Accordingly, this can restrain the first compression-bonding apparatus and the second compression-bonding apparatus from adversely affecting their formation processes each other.

In the method for forming the compression-bonding portions in the continuous body of the web member including the fiber bundle, it is preferable that the continuous body of the web member is wound around the outer peripheral surface of the rotator, with a winding start position to wind around the rotator being set at a position upstream in the direction of rotation from the first compression-bonding apparatus.

With the method for forming the compression-bonding portions in the continuous body of the web member including the fiber bundle, the continuous body of the web member is wound around the rotator from the position upstream with respect to the first compression-bonding apparatus. Accordingly, the first compression-bonding apparatus can stably perform the compression process for the continuous body of the web member.

In the method for forming the compression-bonding portions in the continuous body of the web member including the fiber bundle, it is preferable that a plurality of supporting portions are provided in the outer peripheral surface of the rotator in such a manner as to protrude at intervals of an angle to the direction of rotation, the angle corresponding to a product pitch of the web member, the supporting portions being configured to support formation target parts in the continuous body of the web member, when each of the supporting portions passes through the position of the first compression-bonding apparatus, the supporting portion compresses each of the formation target parts in corporation with the first compression-bonding apparatus, when the supporting portion passes through the position of the second compression-bonding apparatus, the supporting portion compresses the compression-bonding portion of the first stage in corporation with the second compression-bonding apparatus, and when the first compression-bonding apparatus compresses the formation target part in corporation with the supporting portion, the continuous body of the web member has already been supported by at least one of the supporting portions positioned upstream in the direction of rotation from the first compression-bonding apparatus.

With the method for forming the compression-bonding portions in the continuous body of the web member including the fiber bundle, when the first compression-bonding apparatus compresses each formation target part in corporation with the supporting portion, a supporting portion immediately adjacent to the supporting portion positioned upstream in the direction of rotation also has already supported the continuous body of the web member. In specific, these two supporting portions protrude with respect to the outer peripheral surface, and thus the supporting portions each dig into the web member in the thickness direction to support the web member. Accordingly, while the first compression-bonding apparatus is performing compression, a relative movement of the continuous body of the web member can be appropriately restricted by at least two supporting portions. Consequently, the first compression-bonding apparatus can stably perform the process of forming the compression-bonding portions of the first stage.

In the method for forming the compression-bonding portions in the continuous body of the web member including the fiber bundle, it is preferable that the first compression-bonding apparatus includes a first rotating member, the first rotating member being configured to rotate around a rotation axis along the CD direction, while a smooth outer peripheral surface of the first rotating member is opposed to the outer peripheral surface of the rotator, the second compression-bonding apparatus includes a second rotating member, the second rotating member being configured to rotate around a rotation axis along the CD direction, while a smooth outer peripheral surface of the second rotating member is opposed to the outer peripheral surface of the rotator, the supporting portion compresses the formation target part in corporation with the outer peripheral surface of the first rotating member, and the supporting portion compresses the compression-bonding portion of the first stage in corporation with the outer peripheral surface of the second rotating member.

With the method for forming the compression-bonding portions in the continuous body of the web member including the fiber bundle, the supporting portions of the rotator form the compression-bonding portions of the first stage in corporation with the first rotating member having a smooth outer peripheral surface. The supporting portions form the compression-bonding portions of the second stage in corporation with the second rotating member having a smooth outer peripheral surface. Accordingly, the compression-bonding portions can be stably formed.

In the method for forming the compression-bonding portions in the continuous body of the web member including the fiber bundle, it is preferable that a pressing member is disposed at a position upstream in the direction of rotation from the first compression-bonding apparatus, the pressing member being configured to press the continuous body of the web member held on the outer peripheral surface of the rotator, to an inside in a radial direction of rotation of the rotator.

With the method for forming the compression-bonding portions in the continuous body of the web member including the fiber bundle, the fiber bundle can be leveled such that the fiber distribution in the CD direction of the fiber bundle in the continuous body of the web member becomes uniform based on the pressing operation of the pressing member. This can reduce the unevenness in the CD direction in compression-bonding strength of the compression-bonding portions which may be caused by unevenness in fiber distribution. Consequently, the fibers can be firmly fixed at the compression-bonding portions, thereby restraining the fibers from falling off.

In the method for forming the compression-bonding portions in the continuous body of the web member including the fiber bundle, it is preferable that at least one compression-bonding apparatus is disposed at a position downstream in the direction of rotation from the second compression-bonding apparatus, the at least one compression-bonding apparatus being configured to compress the compression-bonding portion of the second stage, a compression process is performed for the continuous body of the web member at intervals of a predetermined period of time, in an order from a compression-bonding apparatus positioned downstream in the direction of rotation to a compression-bonding apparatus positioned adjacently upstream thereto, and after a compression process of a compression-bonding apparatus positioned most upstream in the direction of rotation is completed, a compression process is performed by a compression-bonding apparatus positioned most downstream in the direction of rotation, after an interval of a longest period of time among the intervals of the predetermined period of time.

With the method for forming the compression-bonding portions in the continuous body of the web member including the fiber bundle, an interval of a period of time that is longer than any intervals set between the compression processes is set before the compression process performed by the compression-bonding apparatus positioned most downstream in the direction of rotation, which corresponds to a final finishing process among the compression processes of the plurality of stages. Thus, vibrations of the rotator caused by the compression process performed immediately before by the compression-bonding apparatus positioned most upstream can be sufficiently damped based on such an interval of a long period of time. Accordingly, the compression-bonding apparatus most downstream can perform the compression process with high precision.

An apparatus for forming compression-bonding portions in a continuous body of a web member including a fiber bundle, while conveying the continuous body in a predetermined direction set as a direction of conveyance, the fiber bundle being continuous in the predetermined direction while a fiber direction is set along the predetermined direction, the compression-bonding portions being formed at intervals in the direction of conveyance, the apparatus comprising: a conveying apparatus configured to rotate a rotator around a rotation axis along a CD direction intersecting with the direction of conveyance, while holding the continuous body of the web member on an outer peripheral surface of the rotator, to convey the continuous body of the web member in a direction of rotation of the rotator set as the direction of conveyance; a first compression-bonding apparatus configured to compress a formation target part of each of the compression-bonding portions in the continuous body of the web member in corporation with the rotator, when the formation target part passes through a predetermined position in the direction of rotation, to form the compression-bonding portions of a first stage; and a second compression-bonding apparatus configured to further compress the compression-bonding portion of the first stage in corporation with the rotator, when each of the compression-bonding portions of the first stage passes through a position downstream in the direction of rotation from the predetermined position, to form the compression-bonding portions of a second stage, the compression-bonding portions of the first stage including at least one compression-bonding portion that is positioned between the first compression-bonding apparatus and the second compression-bonding apparatus in the direction of rotation when the second compression-bonding apparatus compresses the compression-bonding portion of the first stage.

With the apparatus for forming the compression-bonding portions in the continuous body of the web member including the fiber bundle, such effects similar to the case of the above-described manufacturing method can be exerted.

Embodiment

Figure 3:
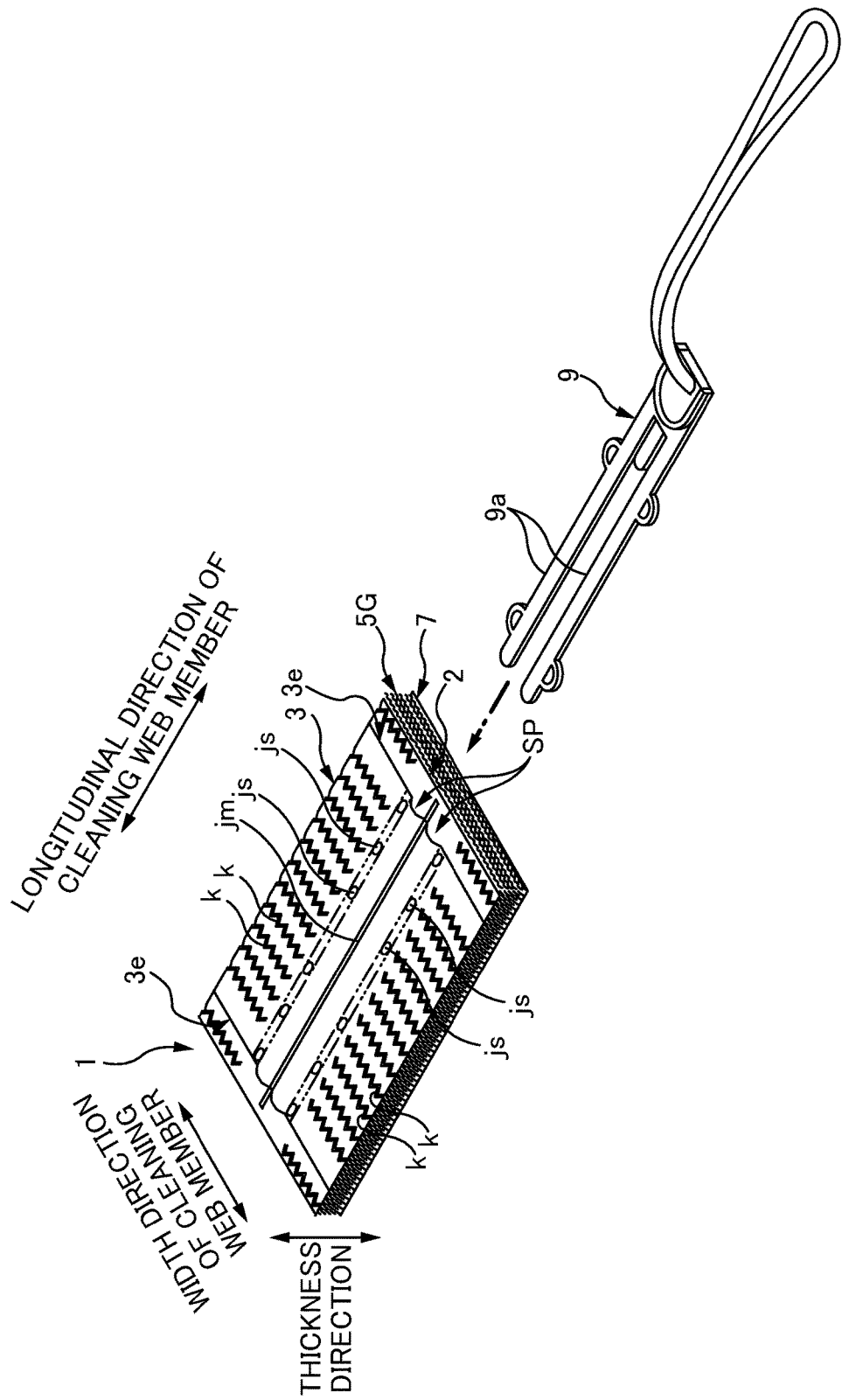
FIG. 3 is a perspective view of a cleaning web member 1 manufactured using a method and an apparatus 10 for forming a compression-bonding portion according to an embodiment of the present disclosure.
Figure 4A:
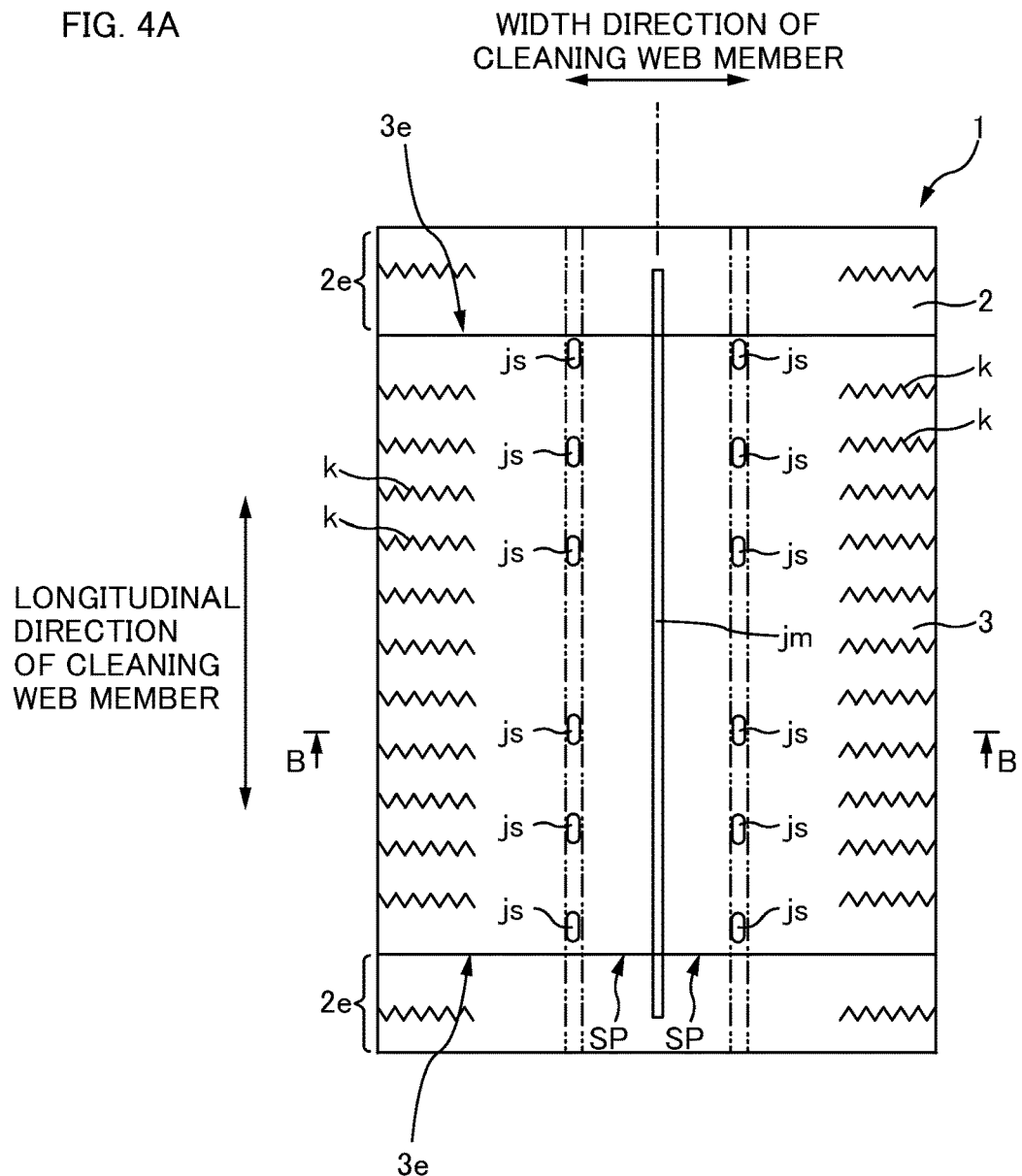
FIG. 4A is a plan view of a cleaning web member 1.

FIG. 3 is a perspective view of a cleaning web member 1 manufactured using a method and an apparatus 10 for forming a compression-bonding portion according to an embodiment of the present disclosure. FIG. 4A is a plan view of the cleaning web member 1, and FIG. 4B is a cross-sectional view of the cleaning web member 1 taken along line B-B in FIG. 4A.

As illustrated in FIGS. 3 and 4A, this cleaning web member 1 has a planar shape of a substantially rectangular shape having a longitudinal direction and a width direction. As illustrated in FIGS. 3 and 4B, a base material sheet 2, an auxiliary sheet 3, a fiber bundle member 5G, and a oblong sheet 7 are disposed in a thickness direction. The auxiliary sheet 3 covers a top surface of the base material sheet 2. The fiber bundle member 5G covers a lower surface of the base material sheet 2 to serve as a main brush portion. The oblong sheet 7 is disposed at a lower surface with respect to the fiber bundle member 5G to serve as an auxiliary brush portion. Between the auxiliary sheet 3 and the base material sheet 2, void portions SP and SP are formed such that a handle member 9 is inserted into the void portions SP and SP to be fixed. Accordingly, two-forked insertions 9a and 9a of the handle member 9 are inserted into these void portions SP and SP. Thus, the cleaning web member 1 is used for cleaning of, for example, a desk, with the lower surface and both ends, in the width direction, of the cleaning web member 1 being used as wiping surfaces.

Figure 4B:
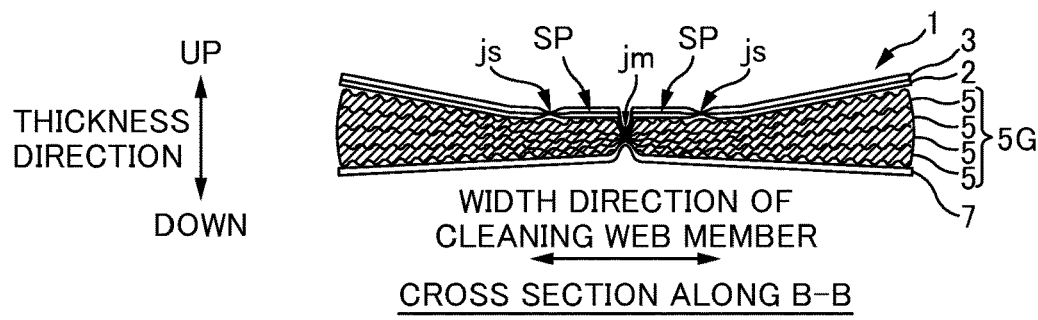
FIG. 4B is a cross-sectional view of a cleaning web member 1 taken along line B-B in FIG. 4A.

As illustrated in FIG. 4B, the fiber bundle member 5G is a member of a plurality of bundles of fiber bundles 5, 5 . . . stacked in a thickness direction. Although, in this example, the four fiber bundles 5, 5 . . . are stacked in the thickness direction as one example of the plurality of bundles, the number of the fiber bundles 5, 5 . . . of the fiber bundle member 5G is not limited to this. For example, the number of the fiber bundles 5, 5 . . . may be one bundle, two bundles, three bundles, or the like.

The fiber bundles 5 each include tows having a fineness of, for example, 3.5 dtex (diameter of 18 to 25 μm) as a large number of continuous fibers. However, the fineness of the tow is not limited to 3.5 dtex. For example, a given value may be selected from a range of 1.1 to 10 dtex (diameter of about 6 to about 60 μm), and further the respective fiber bundles 5 may include the tows having a plurality of finenesses in a range of 1.1 to 10 dtex.

The fiber directions of the fiber bundles 5 are along the width direction of the cleaning web member 1. That is, the longitudinal directions of the tows are along the width direction of the cleaning web member 1. This basically forms both ends in the width direction as distal end portions of the brush portion. Note that, since these tows are flexibly bent and deformable, bending the distal end portions of the tows to the lower surface side of the cleaning web member 1 allows the lower surface to serve as the distal end portion of the brush portion. In this example, all the fibers of the fiber bundles 5 are configured with the tows; however, this should not be construed in a limiting sense. That is, the fiber bundle 5 may include a fiber other than the tow.

Note that, the tow is a fiber made of a continuous filament and is a fiber made of a single component such as polyethylene terephthalate (PET), polypropylene (PP), and polyethylene (PE), a composite fiber with a sheath-core structure whose sheath/core is PE/PET and PE/PP, or a side-by-side composite fiber such as PE/PET and PE/PP. The cross-sectional shape may be a circular shape or a shape other than the circular shape. The fiber may have a crimp, and in this case, a crimper process is performed when the filaments are a manufactured. Further, the number of crimps is increased with a preheat calendar or hot air treatment. A transport roll transports the crimped tows. At this time, a tensile force is provided to the tows in longitudinal directions of the filaments, and the tensile force is released. Repeating this process opens the continuous filaments of the tows so as to be individually separated into pieces.

As illustrated in FIGS. 3, 4A, and 4B, the base material sheet 2 and the auxiliary sheet 3 both have a substantially rectangular shape in planar shape. While the lengths thereof in the width direction are set to the same dimensions as one another, the length in the longitudinal direction of the base material sheet 2 is set longer than that of the auxiliary sheet 3. Accordingly, the auxiliary sheet 3 is stacked on the base material sheet 2 such that both ends 2e and 2e of the base material sheet 2 in the longitudinal direction protrude, by a predetermined length, to the outside from both ends 3e and 3e of the auxiliary sheet 3 in the longitudinal direction.

In this example, both the base material sheet 2 and the auxiliary sheet 3 have zigzag slits k, k . . . along the width direction, with intervals in the longitudinal direction, at respective end portions in the width direction. These slits k, k . . . form a plurality of zigzag strip pieces along the width direction at the end portions, in the width direction, of the base material sheet 2 and the auxiliary sheet 3. Note that these slits k, k . . . may be omitted.

The base material sheet 2 and the auxiliary sheet 3 are, for example, made of a nonwoven fabric containing a thermoplastic fiber. The thermoplastic fiber includes, for example, PE, PP, and PET fiber, a composite fiber of PE and PET (for example, a composite fiber having a sheath-core structure in which core is PE and sheath is PET), and a composite fiber of PE and PP (for example, a composite fiber having a sheath-core structure in which core is PET and sheath is PE). An aspect of the nonwoven fabric is, for example, a thermally bonded nonwoven fabric, a spunbonded nonwoven fabric, and a spunlace nonwoven fabric. Note that the materials of these base material sheet 2 and auxiliary sheet 3 are not limited to the nonwoven fabric. For example, the materials may be a woven fabric or a film.

The oblong sheet 7 is formed of a flexible sheet such as a nonwoven fabric containing a thermoplastic fiber or a thermoplastic resin film. The oblong sheet 7 is formed into a substantially rectangular shape having the same planar surface size as that of the base material sheet 2. At end portions in the width direction of the oblong sheet 7, zigzag slits (not illustrated) are formed along the width direction with intervals in the longitudinal direction. These slits form a plurality of zigzag strip pieces (not illustrated) along the width direction at the end portions in the width direction of the oblong sheet 7. Note that this oblong sheet 7 may be omitted.

These auxiliary sheet 3, base material sheet 2, fiber bundle member 5G of all of the four fiber bundles 5, 5, 5, and 5, and oblong sheet 7 are stacked in the thickness direction in this order. As illustrated in FIGS. 4A and 4B, these sheets 2, 3, and 7 and the fiber bundles 5, 5 . . . are integrally joined by being compressed in the thickness direction substantially at the center in the width direction in the stacked state to form a main joining portion jm into a depressed shape. In this example, such a main joining portion jm is formed like one straight-line groove along the longitudinal direction; however, this should not be construed in a limiting sense. For example, the main joining portion may be formed with the grooves in a plurality of line segments along the longitudinal direction spaced in the longitudinal direction, or a form other than these forms. In this example, the main joining portion jm is configured as a welding portion where the sheets 2, 3, and 7 and the fiber bundles 5, 5 . . . are each melted and bonded; however, this should not be construed in a limiting sense by any means. For example, the main joining portion jm may be the compression-bonding portion where the sheets 2, 3, and 7 and the fiber bundles 5, 5 . . . are press-bonded. The welding portion can also be said as one kind of the compression-bonding portion. Needless to say, with such a main joining portion jm, the tows, which are fibers, of the fiber bundles 5 are welded to be integrally fixed, which restrains the tows from falling off.

A plurality of auxiliary joining portions js, js . . . , which join the auxiliary sheet 3 and the base material sheet 2 together by welding or the like, are formed to be aligned in the longitudinal direction at positions on both sides of this main joining portion jm in the width direction. By virtue of these auxiliary joining portions js, js . . . , the aforementioned void portions SP and SP, into which the handle member 9 is inserted between the auxiliary sheet 3 and the base material sheet 2 to be fixed, are formed at positions between the main joining portion jm and the auxiliary joining portions js, js . . . .

Such cleaning web members 1 are manufactured on a manufacturing line. The manufacturing line includes the heat sealing apparatus 10 as one example of a formation apparatus, which is configured to form the above-described main joining portion jm.

Figure 5A:
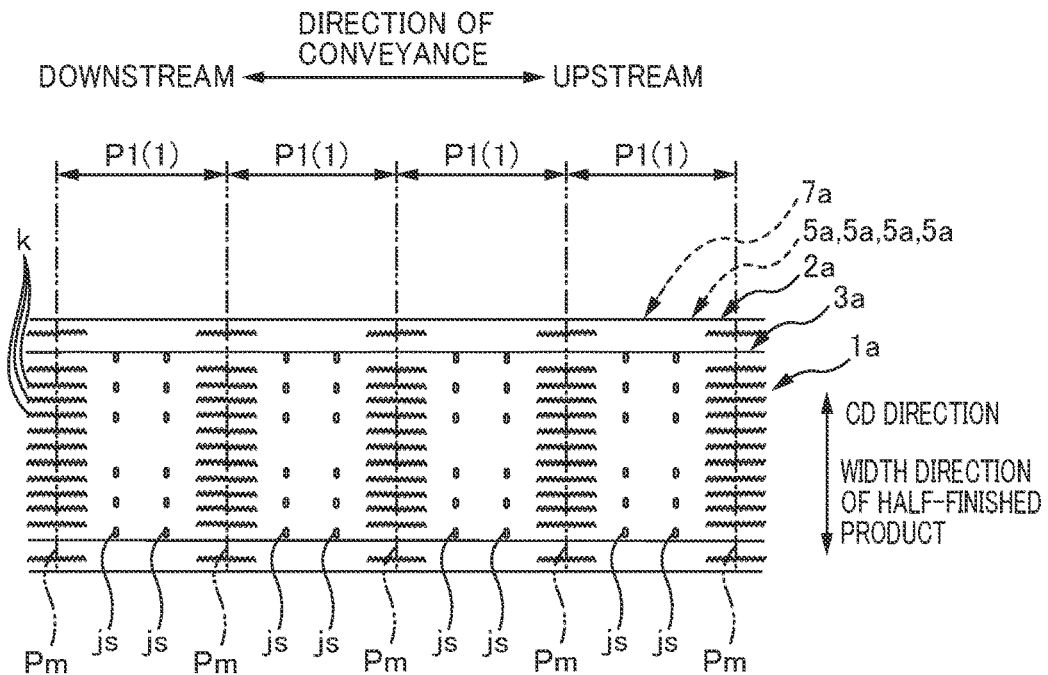
FIG. 5A is a schematic diagram of half-finished products 1a of a cleaning web members 1 immediately before being sent to a heat sealing apparatus 10 serving as one example of a formation apparatus according to an embodiment of the present disclosure.

FIG. 5A is a schematic diagram of half-finished products 1a (corresponding to a continuous body of the web member) of the cleaning web members 1 immediately before being sent to this heat sealing apparatus 10. At this time, the half-finished products 1a are in a state of a continuous body 1a in which the plurality of cleaning web members 1, 1 . . . with the main joining portion jm unformed are connected in the width direction. That is, in the half-finished products 1a, the auxiliary sheets 3, the base material sheets 2, and the oblong sheets 7 are individually in a state of continuous sheets 3a, 2a, and 7a continuous in the width direction. The four fiber bundles 5, 5 . . . are also in a state of continuous bodies 5a, 5a . . . continuous in the width direction, respectively. The continuous sheet 3a of the auxiliary sheet, the continuous sheet 2a of the base material sheets, the continuous bodies 5a, 5a . . . of the four fiber bundles, and the continuous sheet 7a of the oblong sheets are stacked in the thickness direction in this order. The continuous sheet 3a of the auxiliary sheets and the continuous sheet 2a of the base material sheets have already been joined with the auxiliary joining portions js, js . . . .

Figure 5B:
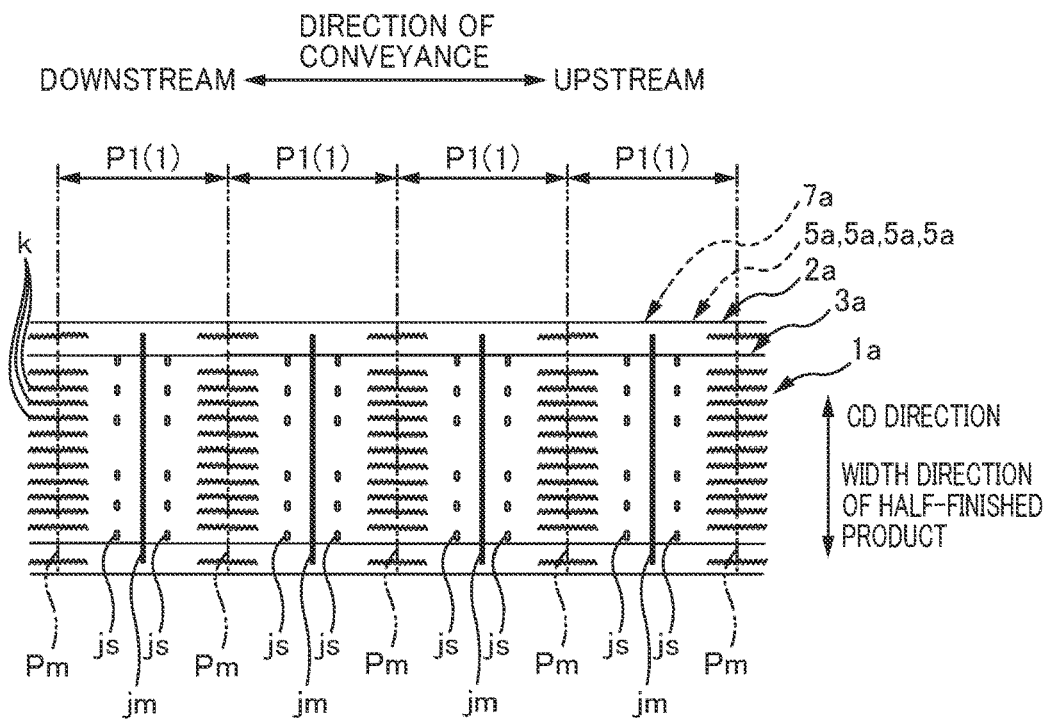
FIG. 5B is a schematic diagram of half-finished products 1a after half-finished products 1a pass through the apparatus 10.

As illustrated in FIG. 5B, while the heat sealing apparatus 10 are conveying the half-finished products 1a in a direction in which the half-finished products 1a continue, which serves as the direction of conveyance, the heat sealing apparatus 10 forms the main joining portions jm on the half-finished products 1a at a product pitch P1 in the direction of conveyance. Then, the half-finished products 1a in which the main joining portions jm are formed are conveyed to a cutting apparatus (not illustrated) positioned downstream from the heat sealing apparatus 10. The apparatus is configured to cut at each intermediate position Pm, as a cutting target position, between the main joining portions jm and jm immediately adjacent to each another in the direction of conveyance, and the cleaning web members 1 are formed as described hereinabove.

As illustrated in FIGS. 5A and 5B, in the heat sealing apparatus 10, a direction corresponding to the width direction of the half-finished product 1a is referred to as a "CD direction." Three directions, which are the CD direction, the direction of conveyance, and the thickness direction of the half-finished product 1a, are in such a relationship as to be orthogonal to one another.

Figure 6B:
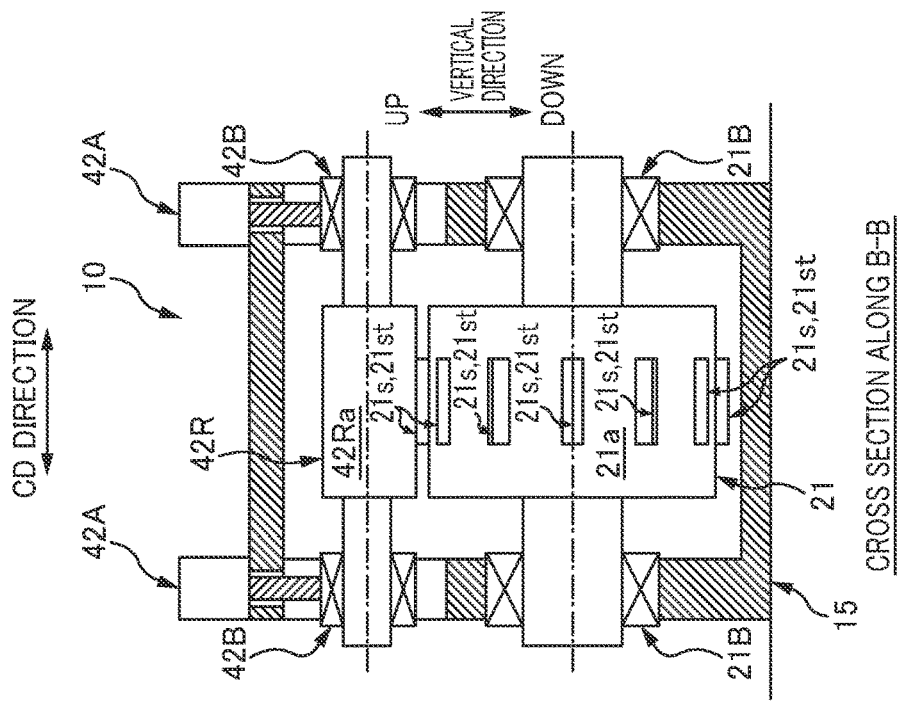
FIG. 6B is an arrow view thereof taken along line B-B in FIG. 6A.
Figure 6A:
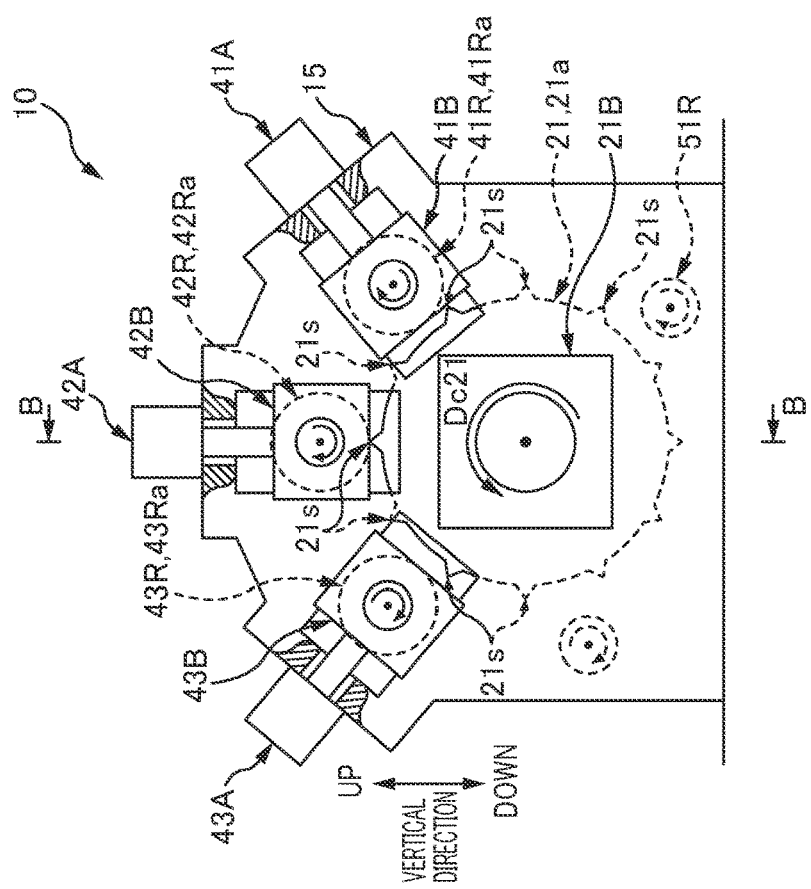
FIG. 6A is a schematic side view of an apparatus 10.
Figure 7:
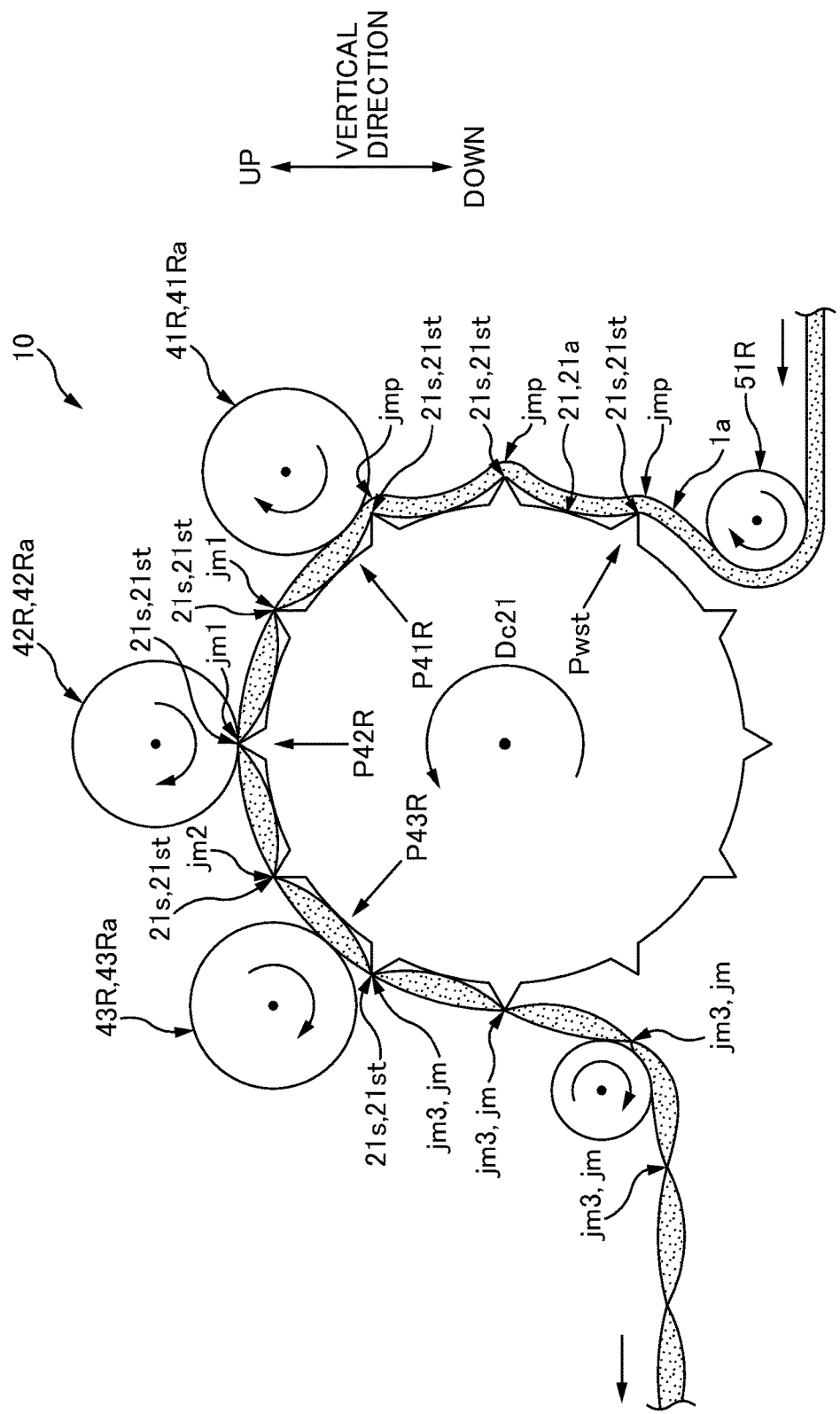
FIG. 7 is a schematic side view illustrating only a main configuration (a rotating drum 21 and first to third seal rolls 41R, 42R, and 43R) of an apparatus 10.

FIG. 6A is a schematic side view of the heat sealing apparatus 10, and FIG. 6B is an arrow view taken along line B-B in FIG. 6A. FIG. 7 is a schematic side view illustrating only a main configuration (a rotating drum 21 and first to third seal rolls 41R, 42R, and 43R) of the apparatus 10. To avoid complication of the drawings, the half-finished product 1a is not illustrated in FIG. 6A or 6B. FIG. 6A illustrates a cutaway view of a part of a housing 15 of the apparatus 10 and the like. FIG. 6B illustrates a part of the configuration of the apparatus 10 (for example, the seal roll 42R and the rotating drum 21) in front view.

As illustrated in FIGS. 6A and 6B, the heat sealing apparatus 10 includes the rotating drum 21, the first to the third seal rolls 41R, 42R, and 43R, and the housing 15. The rotating drum 21 serves as one example of a rotator configured to drive to rotate around a rotation axis that is along the CD direction. The first to the third seal rolls 41R, 42R and 43R are disposed at three positions, in a direction of rotation Dc21, of the rotating drum 21 in such a manner as to be opposed to an outer peripheral surface 21a of the rotating drum 21. The housing 15 supports these rotating drum 21 and first to third seal rolls 41R, 42R and 43R.

As illustrated in FIG. 7, in the apparatus 10, the half-finished products 1a are wound around the outer peripheral surface 21a of the rotating drum 21. With the half-finished products 1a being held in a state where a relative sliding hardly occurs, the apparatus 10 conveys the half-finished products 1a in the direction of rotation Dc21 through a driving rotation of the rotating drum 21. The first to the third seal rolls 41R, 42R, and 43R are disposed in a range where the half-finished products 1a are wound around, with their outer peripheral surfaces 41Ra, 42Ra, and 43Ra being opposed to the outer peripheral surface 21a of the rotating drum 21.

Accordingly, as illustrated in FIG. 7, when a formation target part jmp, where the main joining portion jm is to be formed in the half-finished product 1a, passes through a position P41R of the first seal roll 41R, which is positioned at the most upstream in the range where the half-finished products 1a are wound around, this formation target part jmp is compressed by the first seal roll 41R and the rotating drum 21, thereby forming a welding portion jm1 of a first stage. When the welding portion jm1 of this first stage passes through a position P42R of the second seal roll 42R, which is positioned downstream from the first seal roll 41R, the welding portion jm1 of the first stage is further compressed by the second seal roll 42R and the rotating drum 21, thereby forming a welding portion jm2 of a second stage. Furthermore, when the welding portion jm2 of this second stage passes through a position P43R of the third seal roll 43R, which is positioned downstream from the second seal roll 42R, the welding portion jm2 of the second stage is further compressed by the third seal roll 43R and the rotating drum 21, thereby forming a welding portion jm3 of a third stage. This welding portion jm3 of the third stage corresponds to the above-described main joining portion jm, the main joining portion jm is formed in the half-finished product 1a as described hereinabove.

The following describes the rotating drum 21, the first to the third seal rolls 41R, 42R, and 43R, and the like in detail.

As illustrated in FIG. 6A, the rotating drum 21 is rotatably supported around the rotation axis at a fixed position along the CD direction using a bearing member (s) 21B fixed to the housing 15 in such a manner as to be substantially immovable. The rotating drum 21 is coupled to a servo motor (not illustrated), which serves as a driving source, via an appropriate power transmission mechanism (not illustrated), such as a pulley and a timing belt. This drives the rotating drum 21 to rotate around the rotation axis, and this driving rotation operation is controlled so as to coordinate with a conveyance velocity (m/minute) of the half-finished products 1a conveyed from the upstream side in the direction of conveyance to the rotating drum 21, based on a synchronous signal or the like. Accordingly, while the rotating drum 21 is restraining the half-finished products 1a from being extremely pulled and extremely loosened in the direction of conveyance, the rotating drum 21 ensures holding the half-finished products 1a on the outer peripheral surface 21a.

As illustrated in FIG. 6A, a plurality of supporting portions 21s, 21s . . . are provided to protrude at the outer peripheral surface 21a of the rotating drum 21 at intervals of an angle, to the direction of rotation Dc21, corresponding to the product pitch P1 of the half-finished products 1a. For example, in this example, 12 pieces of the supporting portions 21s and 21s are provided to protrude at intervals of 30° in the direction of rotation Dc21.

Accordingly, with the supporting portions 21s in FIG. 7 digging into the half-finished products 1a in the thickness direction, the half-finished products 1a can be held on the outer peripheral surface 21a of the rotating drum 21 in such a manner as to be substantially relatively immovable. Note that, in order to hold these half-finished products 1a to be substantially relatively immovable with more reliability, a plurality of intake holes (not illustrated) may be provided on the outer peripheral surface 21a of the rotating drum 21, and through such intake air from these intake holes, the half-finished products 1a may be suctioned to be held to the outer peripheral surface 21a.

Further, as illustrated in FIG. 6B, a top surface 21st of the supporting portion 21s is formed in a straight line along the CD direction, with a smooth surface substantially without a depression, corresponding to the linear shape of the above-described main joining portion jm. As has been described, the supporting portion 21s bites into the half-finished product 1a in such a manner as to be substantially relatively immovable.

Accordingly, as illustrated in FIG. 7, when the top surface 21st of the supporting portion 21s passes through the positions P41R, P42R, and P43R of the first to the third seal rolls 41R, 42R, and 43R, the top surface 21st compresses the same part jmp of the half-finished product 1a in corporation with all the rolls of the first to the third seal rolls 41R, 42R, and 43R. This enables the degree of welding in the formation target part jmp of the main joining portion jm to be increased in a stepwise manner such as the first stage, the second stage, and the third stage. This effectively contributes to the formation of the main joining portion jm with a high degree of welding, while restraining broken weld (break in the formation target part jmp that may be caused by increase in amount of compression at a time).

Since this apparatus 10 is the heat sealing apparatus 10, a heating element (not illustrated) configured to heat the outer peripheral surface 21a of the rotating drum 21 is incorporated in the rotating drum 21, and the amount of the heat generation of the heating element is adjusted to adjust a temperature of the outer peripheral surface 21a. Although a target temperature of the outer peripheral surface 21a is determined according to the materials constituting the half-finished product 1a, the target temperature is basically set to an appropriately temperature equal to or less than a melting point of a material having the lowest melting point among the materials. The heating element (s) is (are) disposed at (a) position (s) point symmetric to the rotation axis of the rotating drum 21 such that the outer peripheral surface 21a of the rotating drum 21 is equally heated across the whole circumference thereof. For example, one housing hole (not illustrated) to house the substantially rod-shaped heating element along the rotation axis direction may be formed, with the center of the hole being matched with the rotation axis. Alternatively, a plurality of housing holes may be formed at positions at which the whole circumference of the rotating drum 21 is equally divided in the direction of rotation and also the positions at which the housing holes have an equal distance from the rotation axis in a radial direction of rotation, to house the heating elements into the housing holes, respectively.

Meanwhile, the first to the third seal rolls 41R, 42R, and 43R are respectively configured to be, for example, flat rolls whose outer peripheral surfaces 41Ra, 42Ra, and 43Ra are smooth. As illustrated in FIG. 6A, the seal rolls 41R, 42R and 43R are individually rotatably supported by bearing members 41B, 42B, and 43B around the rotation axis that is along the CD direction. The seal rolls 41R, 42R and 43R each are coupled to the servo motor (not illustrated), which serves as a driving source, via an appropriate power transmission mechanism (not illustrated) such as a pulley and a timing belt. This drives the seal rolls 41R, 42R and 43R to rotate around the rotation axis, and this driving rotation operation is controlled so as to coordinate with a conveyance velocity (m/minute) of the half-finished products 1a, based on a synchronous signal or the like. Accordingly, when compressing the half-finished products 1a in corporation with the rotating drum 21, the seal rolls 41R, 42R and 43R can smoothly compress half-finished products 12a while restraining an excessive load on the half-finished products 1a that may cause, for example, shearing.

The bearing members 41B, 42B, and 43B of the seal rolls 41R, 42R and 43R are supported to reciprocate in the radial direction of rotation of the rotating drum 21 (direction of contact with/separation from the rotating drum 21) via actuators 41A, 42A, and 43A, such as hydraulic cylinders fixed to the housing 15. Accordingly, the actuators 41A, 42A, and 43A can be controlled to adjust the size of the spaces between the seal rolls 41R, 42R and 43R and the rotating drum 21 or the magnitude of a pressing force (N) in the radial direction of rotation. The size of the spaces or the magnitude of the pressing force (N) are adjusted individually for the seal rolls 41R, 42R and 43R such that required degrees of welding can be respectively achieved at the positions of the seal rolls 41R, 42R and 43R. For example, in this example, the spaces are individually adjusted such that the spaces at the time of compression decrease in the order of the first seal roll 41R, the second seal roll 42R, and the third seal roll 43R. This achieves the aforementioned stepwise increase in the degree of welding. Incidentally, when hydraulic cylinders are used as the actuators 41A, 42A, and 43A, such individual adjustments of the spaces can be made, for example, as follows. That is, the individual adjustments can be made such that pressure values (Pa) of hydraulic oil serving as a working fluid supplied to the hydraulic cylinders 41A, 42A, and 43A are adjusted using a pressure regulation mechanism such as a pressure regulation valve. The sizes of the spaces can be obtained through, for example, experiments using an actual apparatus. That is, while the sizes of the spaces are changed in a plurality of levels, the half-finished products 1a are allowed to pass through the heat sealing apparatus 10, and thereafter, the states of the welding portions jm of the half-finished products 1a are checked, thereby being able to obtain the sizes of the spaces.

These first to third seal rolls 41R, 42R, and 43R also internally incorporate the heating elements (not illustrated), respectively, to heat the outer peripheral surfaces 41Ra, 42Ra, and 43Ra. The amounts of heat generation of the heating elements are respectively adjusted to adjust the temperatures of the outer peripheral surfaces 41Ra, 42Ra, and 43Ra. The basic concept of the incorporating positions and the target temperature of the outer peripheral surfaces 41Ra, 42Ra, and 43Ra in the rolls 41R, 42R, and 43R is similar to the case of the above-described rotating drum 21, and thus the descriptions thereof are omitted.

In an embodiment of the present disclosure, to solve the aforementioned problem of the present disclosure, that is, "to reduce the adverse effect that the compression process performed for the welding portions jm1 of the first stage by the second seal roll 42R gives to the formation process performed of the welding portions jm1 of the first stage by the first seal roll 41R positioned upstream in the direction of rotation Dc21, the arrangement positions of the first and the second seal rolls 41R and 42R in the direction of rotation Dc21 are devised. Hereinafter, this device will be described.

That is, as illustrated in FIG. 7, in an embodiment of the present disclosure, the rolls 41R and 42R are disposed such that at least one welding portion jm1 of the first stage is positioned between the first seal roll 41R (corresponding to the first rotating member of the first compression-bonding apparatus) and the second seal roll 42R (corresponding to the second rotating member of the second compression-bonding apparatus) in the direction of rotation Dc21 when the second seal roll 42R compresses the welding portion jm1 of the first stage. More specifically, the first and second seal rolls 41R and 42R are disposed, when the compression by the second seal roll 42R, such that at least one welding portion jm1 of the first stage is positioned between the position P41R, where the first seal roll 41R compresses the half-finished product 1a in corporation with the supporting portion 21s of the rotating drum 21 in the direction of rotation Dc21, and the position P42R, where the second seal roll 42R compresses the half-finished product 1a in corporation with the supporting portion 21s of the rotating drum 21 similarly in the direction of rotation Dc21.

Accordingly, the transmission of the tensile force in each fiber in the direction of conveyance, which may be caused in the continuous bodies 5a, 5a . . . of the fiber bundles of the half-finished products 1a when the second seal roll 42R compresses the welding portions jm1 of the first stage, is substantially cut off at the welding portion (s) jm1 of the first stage positioned between the first seal roll 41R and the second seal roll 42R in the direction of rotation Dc21. That is, this tensile force in each fiber hardly is transmitted to the position P41R of the first seal roll 41R. Therefore, this can reduce the adverse effect, such as disturbance of fiber distribution, given from the compression process performed for the welding portions jm1 of the first stage by the second seal roll 42R to the formation process performed for the welding portion jm1 of the first stage by the first seal roll 41R positioned at the upstream in the direction of rotation Dc21.

Here, from an aspect of improving cutting-off of the tensile force transmission in each fiber, it is preferable that a large number of the welding portions jm1 of the first stage are positioned between the first seal roll 41R and the second seal roll 42R. That is, it is more preferable to position the plurality of welding portions jm1 of the first stage therebetween than to position only one of the welding portions jm1 of the first stage therebetween as described above.

Meanwhile, as illustrated in FIG. 7, from an aspect of increasing the degree of welding at the second seal roll 42R, it is preferable that only one of the welding portions jm1 of the first stage is positioned between the first seal roll 41R and the second seal roll 42R. That is, this allows the second seal roll 42R to compress the welding portion jm1 of the first stage while the heat when the first seal roll 41R forms the welding portion jm1 of the first stage remains. Consequently, the second seal roll 42R easily increases the degree of welding of the welding portion jm2 of the second stage.

Figure 8:
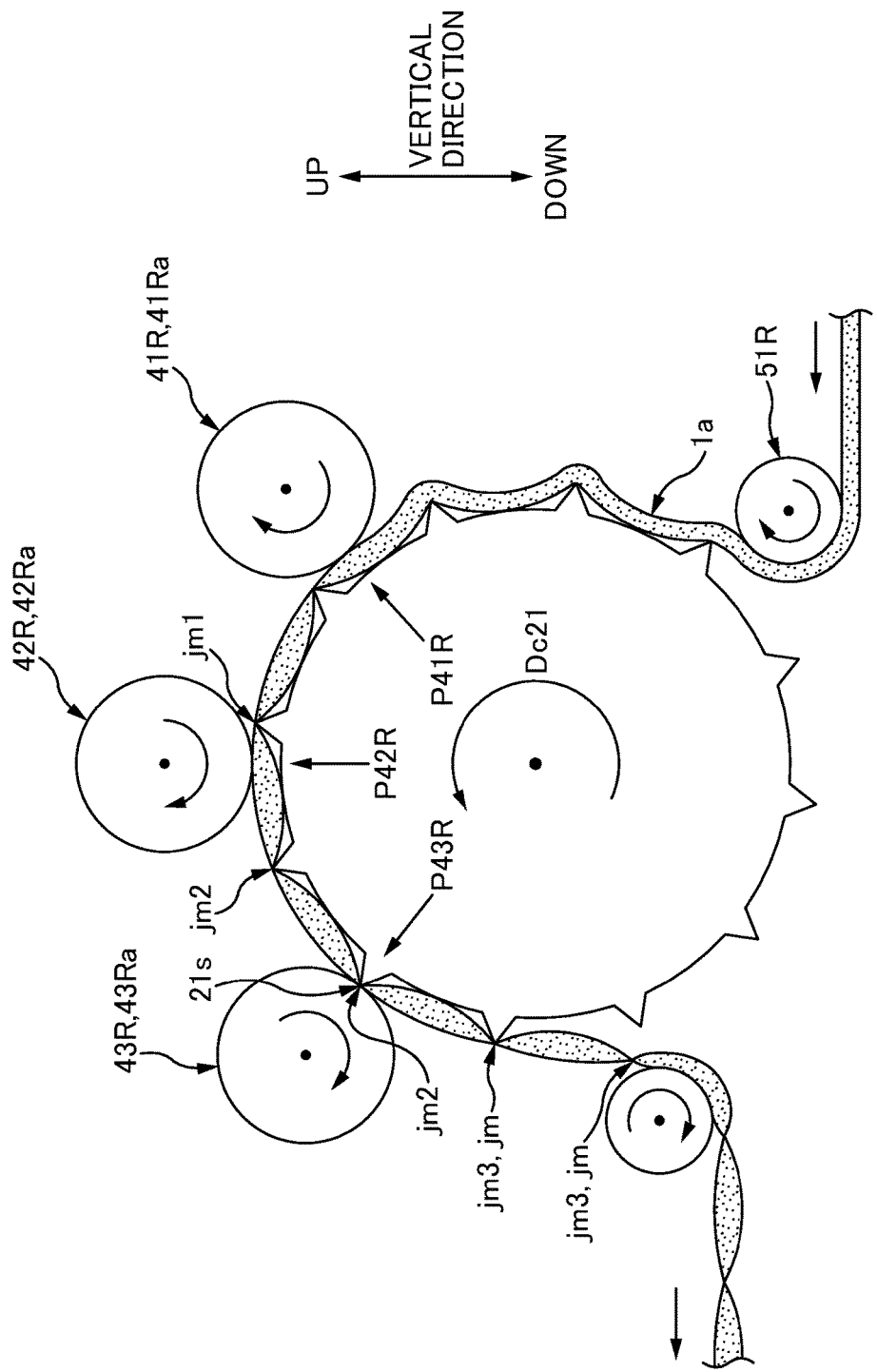
FIG. 8 is a schematic side view of the same.

The arrangement positions may be devised with respect to the second seal roll 42R and the third seal roll 43R. That is, as illustrated in FIG. 8, when the third seal roll 43R compresses the welding portion jm2 of the second stage, the second and third rolls 42R and 43R may be disposed such that at least one welding portion jm2 of the second stage is positioned between the second seal roll 42R and the third seal roll 43R in the direction of rotation Dc21.

With such a configuration, based on the similar reason as described above, it is possible to reduce the adverse effect that the compression process performed for the welding portion jm2 of the second stage by the third seal roll 43R gives to the formation process performed on the welding portion jm2 of the second stage by the second seal roll 42R positioned upstream in the direction of rotation Dc21.

From the aspect of improving cutting-off of the tensile force in each fiber transmission, it is preferable that a plurality of welding portions jm2 of the second stage are positioned between the second seal roll 42R and the third seal roll 43R. From the aspect of increasing the degree of welding at the third seal roll 43R, it is preferable that only one of the welding portions jm2 of the second stage is positioned between the second seal roll 42R and the third seal roll 43R. Since these are similar to those described above, the descriptions thereof are omitted.

Further, as illustrated in FIG. 7, one of the first seal roll 41R and the second seal roll 42R preferably compresses the half-finished products 1a when the other seal roll does not compress the half-finished products 1a. With such a configuration, the tensile force generated in the half-finished products 1a when one of the first seal roll 41R and the second seal roll 42R compresses thereto can be restrained from being transmitted to a part of the half-finished product 1a being compressed by the other seal roll and stretching this part with the tensile force. This also restrains the vibration generated in the rotating drum 21 which is caused by the compression by the one seal roll 41R (42R) from affecting the compression performed by the other seal roll 42R (41R) and causing unstable welding process.

Such a compression-timing-shifting operation can be performed through the adjustments of the position P42R at which the second seal roll 42R is arranged and the position P41R at which the first seal roll 41R is arranged in the direction of rotation Dc21. For example, the first and second seal rolls 41R and 42R are disposed such that, when one supporting portion 21s passes through the position P42R where the second seal roll 42R is arranged, another supporting portion 21s does not pass through the position P41R where the first seal roll 41R is arranged, thereby achieving the above-described shifting operation. More specifically, for example, as illustrated in FIG. 7, it is only necessary to dispose the first and second rolls 41R and 42R such that, when one supporting portion 21s passes through the position P42R where the second seal roll 42R is arranged, another supporting portion 21s adjacent on the upstream side to the one supporting portion 21s passes through an intermediate position between the position P41R where the first seal roll 41R is arranged and the position P42R where the second seal roll 42R is arranged in the direction of rotation Dc21 or a position near the intermediate position.

The similar compression-timing-shifting operation may be performed with respect to the second seal roll 42R and the third seal roll 43R.

Further preferably, the compression timings of the first seal roll 41R to the third seal roll 43R may be set based on the compression-timing-shifting operation as follows. That is, as apparent from FIG. 7, the third seal roll 43R performs compression, and then the second seal roll 42R performs compression after an interval of a second short period of time. After the compression performed by the second seal roll 42R, the first seal roll 41R performs compression after an interval of a first short period of time. After the compression performed by the first seal roll 41R, the third seal roll 43R performs compression after an interval of a third long period of time.

With such a configuration, the vibration of the rotating drum 21, which is caused by the compression process of the first seal roll 41R performed immediately before, can be sufficiently damped based on the third period of time, before the compression process of the third seal roll 43R is performed, which corresponds to a final finishing among the three-stage compression processes, the third period of time being set longer than the first and second periods of time. Accordingly, the compression process of the third seal roll 43R can be performed highly-accurately.

Figure 9:
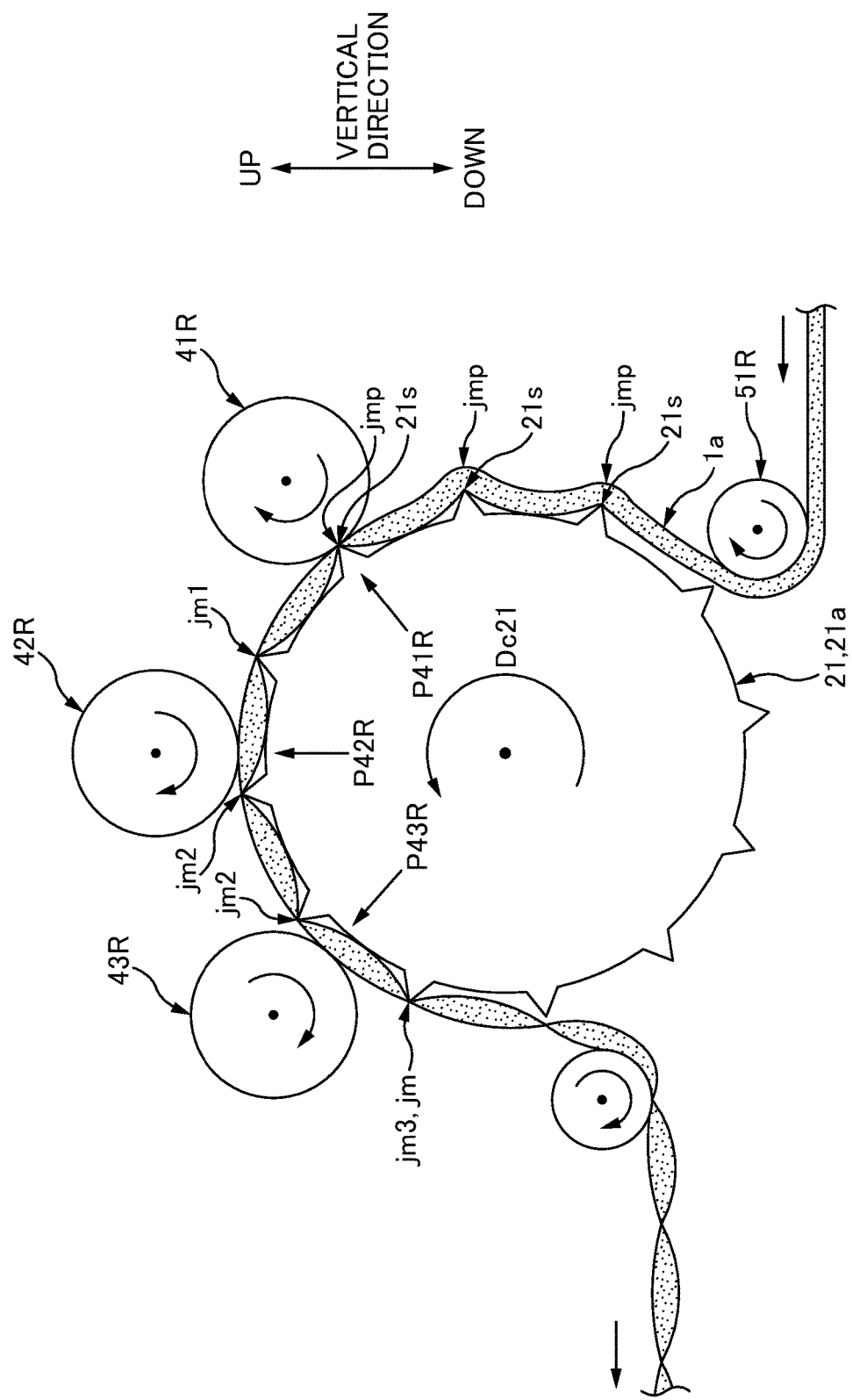
FIG. 9 is a schematic side view of the same.

In this example of FIG. 7, a winding start position Pwst of the half-finished products 1a to wind around the rotating drum 21 is set at the position upstream, in the direction of rotation Dc21, from the position P41R at which the first seal roll 41R is arranged. Thus, as illustrated in FIG. 9, when the first seal roll 41R compresses the formation target part jmp of the main joining portion jm in the half-finished products 1a in corporation with the supporting portion 21s, the half-finished product(s) 1a has (have) already been contacted with and supported by at least one supporting portion 21s that is positioned upstream, in the direction of rotation Dc21, from the first seal roll 41R.

Accordingly, during the compression by the first seal roll 41R, at least two supporting portions 21s and 21s appropriately restrict the relative movement of the half-finished products 1a. Consequently, the first seal roll 41R can stably perform the formation process of the welding portions jm1 of the first stage at the formation target parts jmp in the half-finished products 1a. Incidentally, in the example of FIG. 9, when the first seal roll 41R compresses each of the formation target parts jmp, two supporting portions 21s and 21s contact to support the half-finished products 1a at the positions upstream, in the direction of rotation Dc21, from the first seal roll 41R; however, this should not be construed in a limiting sense. That is, the number of the supporting portions 21s may be one or may be three or more.

The half-finished products 1a are wound around the rotating drum 21 from the winding start position Pwst, for example, with an auxiliary roll 51R for winding being disposed at a position near the winding start position Pwst. That is, at this position, the roll 51R which is configured to rotate around a rotation axis along the CD direction is disposed, as the auxiliary roll 51R, near the outer peripheral surface 21a of the rotating drum 21. In this case, further preferably, as illustrated in FIG. 9, the half-finished products 1a are wound also around the auxiliary roll 51R at a predetermined winding angle. With this configuration, a conveyance path for the half-finished products 1a includes an S-shaped conveyance path portion that is positioned upstream, in the direction of rotation Dc21, from the position of the first seal roll 41R. Therefore, when the half-finished products 1a pass through this S-shaped conveyance path portion, the continuous bodies 5a, 5a . . . of the fiber bundles of the half-finished products 1a are subjected to a bending process twice in bending directions opposite to each other. This smoothes the continuous bodies 5a, 5a . . . such that the fiber distribution becomes uniform in the continuous bodies 5a and 5a of the fiber bundles in the CD direction. Consequently, unevenness in weld strength of the main joining portions jm, which may be caused by the deviation of the fiber distribution, can be reduced across the CD direction. This allows the fibers to be firmly fixed one another at the main joining portions jm, thereby restraining the fibers from falling off.

Such auxiliary roll 51R may be configured as a driven rotation roll that obtains a rotation force through contact with the half-finished product 1a to guide the half-finished product 1a. Alternatively, the auxiliary roll 51R may be configured as a drive rotation roll that obtains a rotation force from an appropriate driving source, such as a servo motor, to rotate.

Figure 10:
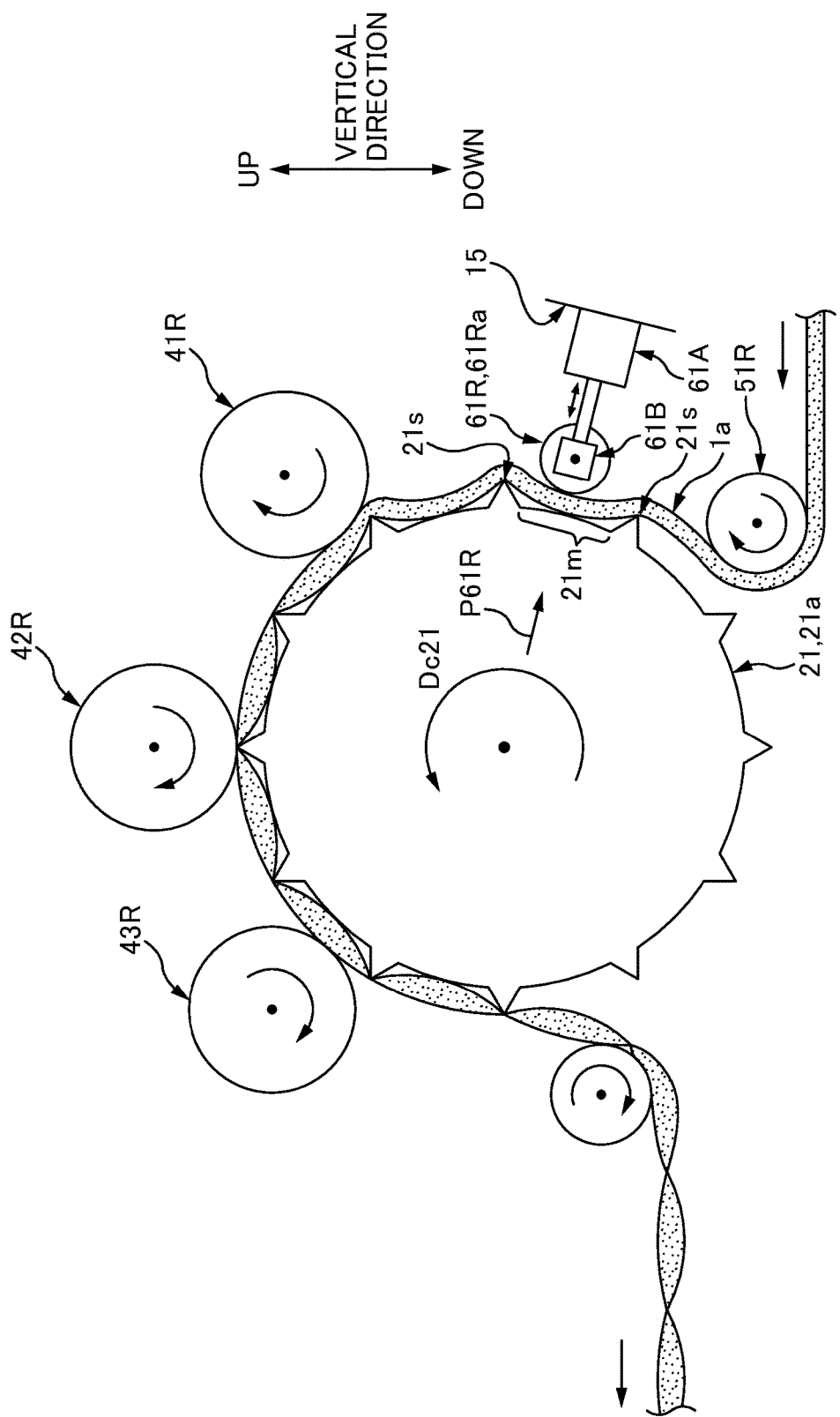
FIG. 10 is a schematic side view of a heat sealing apparatus 10 including a pressing roll 61R.

Preferably, as illustrated in the schematic side view of FIG. 10, a pressing roll 61R (corresponding to a pressing member) may be disposed at a position between the auxiliary roll 51R and the first seal roll 41R in the direction of rotation Dc21. The pressing roll 61R is configured to press the half-finished products 1a wound around the outer peripheral surface 21a of the rotating drum 21 to the inside in the radial direction of rotation. With this configuration, the continuous bodies 5a, 5a . . . of the fiber bundles of the half-finished products 1a can be smoothed such that the fiber distribution of the continuous bodies 5a, 5a . . . becomes uniform in the CD direction, based on the pressing operation by the pressing roll 61R. Accordingly, as described above, unevenness in the weld strength of the main joining portions jm, which may be caused by unevenness in the fiber distribution, can be reduced across the CD direction.

The pressing roll 61R having such a function is, for example, a roll in which a part thereof including an outer peripheral surface 61Ra is made of a rubber or a resin. The roll 61R is supported, around the rotation axis along the CD direction, at both sides by bearing members 61B and 61B which are disposed at the end portions in the CD direction. Additionally, the roll 61R is configured to be reciprocatable in the radial direction of rotation of the rotating drum 21. That is, it is configured such that the bearing members 61B and 61B are guided to be reciprocatable in the radial direction of rotation of the rotating drum 21 by a guiding member (not illustrated) such as a linear guide fixed to the housing 15, and that the pressing force in the radial direction of rotation is exerted to the bearing members 61B and 61B from an air cylinder 61A as one example of the actuator 61A that is fixed to the housing 15.

Accordingly, when the supporting portion 21s passes through an arrangement position P61R of the pressing roll 61R in the direction of rotation Dc21, the pressing roll 61R is moved by the supporting portion 21s to the outside in the radial direction of rotation of the rotating drum 21 while resisting the pressing force exerted by the actuator 61A. When a part 21m, which is between the supporting portions 21s and 21s immediately adjacent to each other in the direction of rotation Dc21, passes through the arrangement position P61R, the pressing roll 61R is moved by the pressing force exerted by the actuator 61A to the inside in the radial direction of rotation. Accordingly, the pressing roll 61R periodically reciprocates in the radial direction of rotation at the product pitch P1. With the pressing roll 61R, which is configured to reciprocate as such, being used to press the half-finished products 1a, the magnitude of the pressing force can be varied comparatively largely. This makes it possible to promote the equalization of the fiber distribution of the continuous bodies 5a, 5a . . . of the fiber bundles.

The magnitude of the pressing force (N) exerted by the pressing roll 61R is set to the magnitude at which the welding portion (or the compression-bonding portion) is not formed in the half-finished product 1a. Accordingly, the roll 61R is configured as a roll exclusively dedicated to and specialized in the aforementioned process of equalizing the fiber distribution. Incidentally, the magnitude of the pressing force (N) at which the welding portion is not formed can be obtained by, for example, an experiment using an actual apparatus. That is, the half-finished products 1a are caused to pass through the heat sealing apparatus 10 in a state where the first to the third seal rolls 41R, 42R, and 43R do not perform compression, while the magnitude of the pressing force (N) is being changed at a plurality of levels. Thereafter, presence/absence of the welding portions formed in the half-finished products 1a is checked. Accordingly, the magnitude of the pressing force (N) can be obtained. The adjustments of the pressing force (N) to such a magnitude as above can be achieved by adjusting a pressure value (Pa) of compressed air, serving as a working fluid supplied to the air cylinder 61A, using a pressure regulation mechanism such as a pressure regulation valve.

Figure 11:
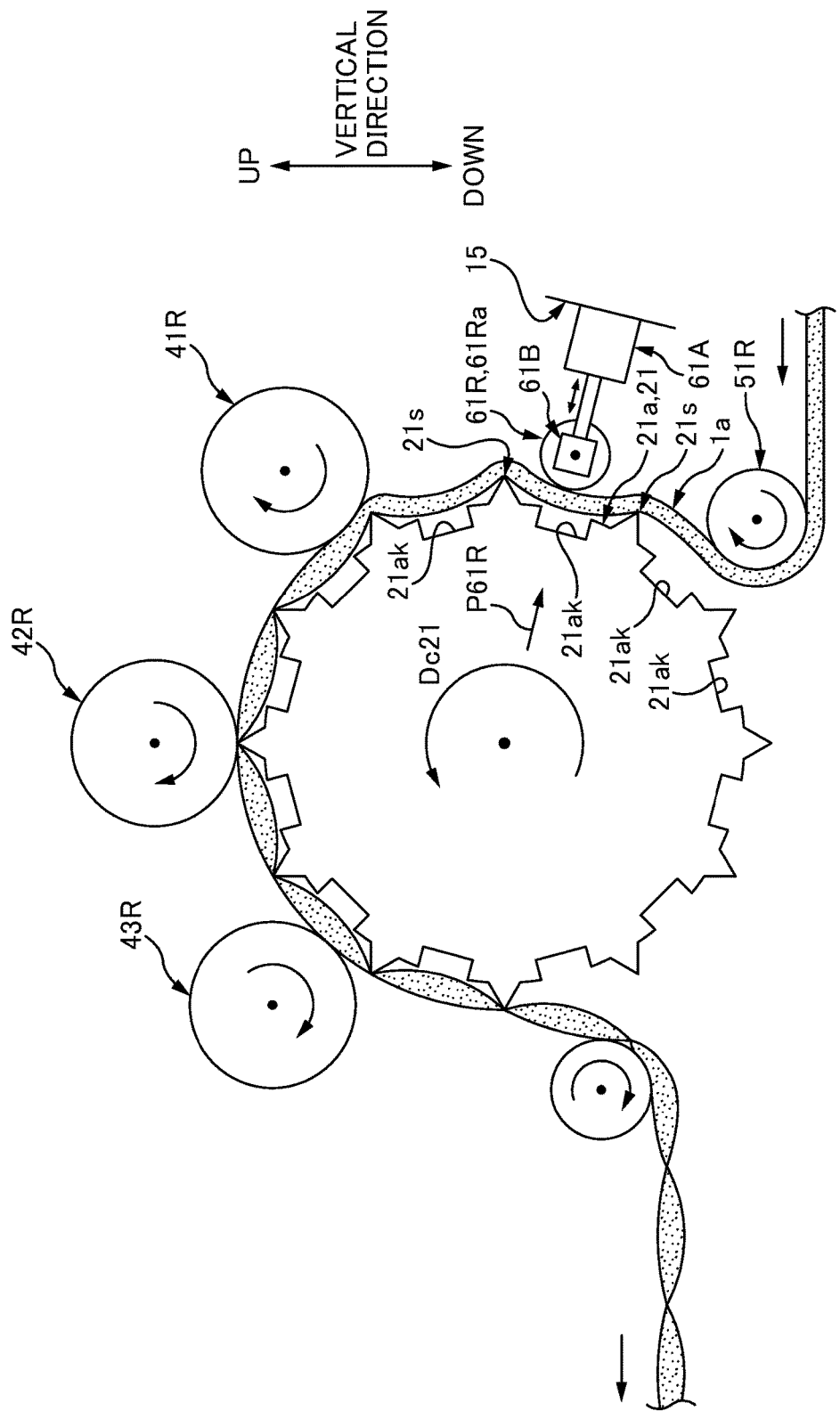
FIG. 11 is a schematic side view of an example in which recessed portions 21ak are provided to an outer peripheral surface 21a of a rotating drum 21.

Depending on the case, as illustrated in FIG. 11, recessed portions 21ak recessed in the radial direction of rotation with respect to the outer peripheral surface 21a may be formed each at a position between the supporting portions 21s and 21s immediately adjacent to each another in the outer peripheral surface 21a of the rotating drum 21. Such a recessed portion 21ak has a size in which at least a part of the pressing roll 61R comes into. Accordingly, a stroke of the reciprocating movement of the pressing roll 61R can be further increased. Consequently, it becomes possible to further effectively promote the above-described equalization of the fiber distribution.

The pressing roll 61R may be configured as a driven rotation roll that obtains the rotation force through contact with the half-finished product 1a to guide the half-finished product 1a. Alternatively, the pressing roll 61R may be configured as a drive rotation roll that obtains the rotation force from an appropriate driving source, such as a servomotor, to rotate. As the actuator 61A, a compression spring or the like can be employed in place of the air cylinder.

Other Embodiments

While the embodiments of the present disclosure are described hereinabove, embodiments are intended for easy understanding of the present disclosure and are not to be construed as limiting the present disclosure. Needless to say, the present disclosure may be modified and improved without departing from the scope of the disclosure, and equivalents thereof are also encompassed by the disclosure. For example, following modifications are possible.

In the above-described embodiments, the rotating drum 21 is given as one example of the rotator, the first seal roll 41R and the second seal roll 42R are given as examples of the first rotating member of the first compression-bonding apparatus and the second rotating member of the second compression-bonding apparatus, respectively, and further the pressing roll 61R is given as one example of the pressing member, this should not be construed in a limiting sense. For example, an endless belt configured to drive to circle may be used as the rotator, first rotating member, second rotating member, and pressing member. Incidentally, the endless belt is run around at least two rollers, and a drive rotation force is given to at least one of the rollers from a driving source such as a servo motor. This rotates the belt in a circumferential direction of the belt.

Although the above-described embodiments include the three seal rolls 41R, 42R and 43R as examples of a plurality of rolls, the number of seal rolls is not limited to this. For example, the seal rolls 41R, 42R and 43R may be two or may be four or more.

As illustrated in FIG. 7, in the above-described embodiments, the flat rolls whose outer peripheral surfaces 41Ra, 42Ra, and 43Ra are smooth as examples of the first to the third seal rolls 41R, 42R, and 43R; however, this should not be construed in a limiting sense. For example, protrusions (not illustrated) that protrude from the outer peripheral surfaces 41Ra, 42Ra, and 43Ra may be disposed, corresponding to the supporting portions 21s of the rotating drum 21, on the outer peripheral surfaces 41Ra, 42Ra, and 43Ra of the seal rolls 41R, 42R and 43R. In this case, the protrusion of the first seal roll 41R compresses the formation target part jmp of the main joining portion jm in cooperation with the supporting portion 21s. The protrusion on the second seal roll 42R compresses the welding portion jm1 of the first stage in cooperation with the supporting portion 21s. The protrusion on the third seal roll 43R compresses the welding portion jm2 of the second stage in cooperation with the supporting portion 21s.

In the above-described embodiments, the top surface 21st of the supporting portion 21s is formed as a smooth surface substantially without a recess; however, this should not be construed in a limiting sense. For example, the top surface 21st may have a plurality of recesses in an appropriate arrangement pattern.

In the above-described embodiments, the half-finished products 1a serving as one example of the continuous body of the web member include the continuous sheet 3a of the auxiliary sheets, the continuous sheet 2a of the base material sheets, the continuous bodies 5a, 5a . . . of the four fiber bundles, and the continuous sheet 7a of the oblong sheets; however, this should not be construed in a limiting sense. That is, it is only necessary that the half-finished products 1a have at least one bundle of the continuous body 5a as the fiber bundle. Accordingly, for example, any one or two of all of the continuous sheet 3a of the auxiliary sheets, the continuous sheet 2a of the base material sheets, and the continuous sheet 7a of the oblong sheets may be omitted. Further, the continuous body 5a of the fiber bundle is not limited to four bundles.

As illustrated in FIG. 7, in the above-described embodiments, the continuous sheet 3a of the auxiliary sheets, the continuous sheet 2a of the base material sheets, the continuous bodies 5a, 5a . . . of the four fiber bundles, and the continuous sheet 7a of the oblong sheets have already been stacked and sent to the heat sealing apparatus 10; however, this should not be construed in a limiting sense. That is, some or all of the continuous sheets 3a, 2a, and 7a and continuous bodies 5a, 5a . . . of the fiber bundles may be individually conveyed up to the position of the auxiliary roll 51R of the heat sealing apparatus 10. That is, the stacked state as described above may be configured such that these members are joined to one another at the position of the roll 51R.

The invention claimed is:

1. A method of forming compression-bonding portions in a continuous body of a web member at intervals in a direction of conveyance, the method comprising:
conveying the continuous body of the web member in the direction of conveyance, wherein the web member includes a fiber bundle continuously elongated in a fiber direction of the fiber bundle extending along the direction of conveyance;
rotating a rotator around a rotation axis extending along a cross direction intersecting with the direction of conveyance, while holding the continuous body of the web member on an outer peripheral surface of the rotator, to convey the continuous body of the web member in a direction of rotation of the rotator;
compressing, by a first compression-bonding apparatus and the rotator, a formation target part of each of the compression-bonding portions to be formed in the continuous body of the web member, when the formation target part passes through a position of the first compression-bonding apparatus disposed at a predetermined position in the direction of rotation, to form the compression-bonding portions of a first stage; and
further compressing, by a second compression-bonding apparatus and the rotator, each of the compression-bonding portions of the first stage, when each of the compression-bonding portions of the first stage passes through a position of the second compression-bonding apparatus disposed downstream in the direction of rotation from the first compression-bonding apparatus, to form the compression-bonding portions of a second stage,
wherein
at least one compression-bonding portion of the first stage, among the compression-bonding portions of the first stage, is positioned between the first compression-bonding apparatus and the second compression-bonding apparatus in the direction of rotation when the second compression-bonding apparatus compresses a further compression-bonding portion of the first stage among the compression-bonding portions of the first stage, and
the first compression-bonding apparatus and the second compression-bonding apparatus are immediately adjacent to each other in the direction of rotation.

2. The method according to claim 1, wherein
when the second compression-bonding apparatus compresses the further compression-bonding portion of the first stage, a plurality of the compression-bonding portions of the first stage is positioned between the first compression-bonding apparatus and the second compression-bonding apparatus in the direction of rotation.

3. The method according to claim 1, wherein
when the second compression-bonding apparatus compresses the further compression-bonding portion of the first stage, only one of the compression-bonding portions of the first stage is positioned between the first compression-bonding apparatus and the second compression-bonding apparatus in the direction of rotation.

4. The method according to claim 1, wherein
one of the first compression-bonding apparatus and the second compression-bonding apparatus performs compression, while the other of the first compression-bonding apparatus and the second compression-bonding apparatus does not perform compression.

5. The method according to claim 1, wherein
the continuous body of the web member is wound around the outer peripheral surface of the rotator, with a winding start position to wind around the rotator being set at a position upstream in the direction of rotation from the first compression-bonding apparatus.

6. The method according to claim 5, wherein
a plurality of supporting portions is provided on the outer peripheral surface of the rotator at angular intervals in the direction of rotation, the angular intervals corresponding to a product pitch of the web member, the supporting portions protruding from the outer peripheral surface of the rotator and being configured to support formation target parts, including the formation target part of each of the compression-bonding portions, in the continuous body of the web member,
when each of the supporting portions passes through the position of the first compression-bonding apparatus, said each of the supporting portions compresses one of the formation target parts in cooperation with the first compression-bonding apparatus,
when each of the supporting portions passes through the position of the second compression-bonding apparatus, said each of the supporting portions compresses one of the compression-bonding portions of the first stage in corporation cooperation with the second compression-bonding apparatus, and
when the first compression-bonding apparatus compresses the formation target part of each of the compression-bonding portions in cooperation with one of the supporting portions, the continuous body of the web member is already supported by at least another one of the supporting portions positioned upstream in the direction of rotation from the first compression-bonding apparatus.

7. The method according to claim 6, wherein
the first compression-bonding apparatus includes a first rotating member, the first rotating member being configured to rotate around a rotation axis extending along the cross direction, while a smooth outer peripheral surface of the first rotating member is opposed to the outer peripheral surface of the rotator,
the second compression-bonding apparatus includes a second rotating member, the second rotating member being configured to rotate around a rotation axis extending along the cross direction, while a smooth outer peripheral surface of the second rotating member is opposed to the outer peripheral surface of the rotator,
the supporting portions compress the formation target parts in cooperation with the outer peripheral surface of the first rotating member, and
the supporting portions compress the compression-bonding portions of the first stage in cooperation with the outer peripheral surface of the second rotating member.

8. The method according to claim 1, wherein
a pressing member is disposed at a position upstream in the direction of rotation from the first compression-bonding apparatus, the pressing member being configured to press the continuous body of the web member held on the outer peripheral surface of the rotator, to an inside in a radial direction of the rotator.

9. The method according to claim 1, wherein
at least one compression-bonding apparatus is disposed at a position downstream in the direction of rotation from the second compression-bonding apparatus, the at least one compression-bonding apparatus being configured to compress the compression-bonding portions of the second stage,
a compression process by the second compression-bonding apparatus is performed after a first predetermined period of time has lapsed since a compression process performed by the at least one compression-bonding apparatus,
a compression process by the first compression-bonding apparatus is performed after a second predetermined period of time has lapsed since the compression process performed by the second compression-bonding apparatus, and
the compression process by the at least one compression-bonding apparatus is performed after a third predetermined period of time has lapsed since the compression process performed by the first compression-bonding apparatus, the third predetermined period of time being greater than the first predetermined period of time and the second predetermined period of time.

10. The method according to claim 1, wherein
a plurality of supporting portions protrudes outwardly from the outer peripheral surface of the rotator and performs a compression process in cooperation with the first and second compression-bonding apparatuses, and
a distance between the position of the first compression-bonding apparatus and the position of the second compression-bonding apparatus in the direction of rotation is greater than a distance between two immediately adjacent support portions among the plurality of supporting portions in the direction of rotation.

* * * * *